United States Patent [19]

Nakamura

[11] Patent Number: 5,580,308
[45] Date of Patent: Dec. 3, 1996

[54] ELECTRONIC BATTLE GAME PLAYING APPARATUS WITH FACIAL MONTAGE GENERATION

[75] Inventor: Toshiki Nakamura, Tachikawa, Japan

[73] Assignee: Casio Computer Co., Ltd., Tokyo, Japan

[21] Appl. No.: 272,420

[22] Filed: Jul. 8, 1994

[30] Foreign Application Priority Data

Jul. 14, 1993 [JP] Japan .................................. 5-196962
Jul. 14, 1993 [JP] Japan .................................. 5-196963

[51] Int. Cl.[6] ........................................................ A63F 9/24
[52] U.S. Cl. ............................................. 463/7; 463/1
[58] Field of Search ................................. 273/433, 434,
273/437, 438, 85 G, 148 B, DIG. 28; 364/410;
434/270, 81, 185; 395/133, 155, 161, 152;
345/121, 122; 463/1, 7, 8

[56] References Cited

U.S. PATENT DOCUMENTS

| | | | |
|---|---|---|---|
| 4,104,625 | 8/1978 | Bristow et al. | 273/DIG. 28 |
| 4,315,628 | 2/1982 | Balash et al. . | |
| 4,884,972 | 12/1989 | Gasper | 395/152 X |
| 5,111,409 | 5/1992 | Gasper et al. . | |

FOREIGN PATENT DOCUMENTS

| | | | |
|---|---|---|---|
| 0065862 | 12/1982 | European Pat. Off. . | |
| 0584758A2 | 3/1994 | European Pat. Off. . | |
| 3-129572 | 6/1991 | Japan . | |
| 3-193074 | 8/1991 | Japan . | |
| 5184726 | 7/1993 | Japan | 273/434 |
| 2106789 | 4/1983 | United Kingdom | 273/434 |
| 2163929 | 3/1986 | United Kingdom | 273/85 G |

OTHER PUBLICATIONS

Sam S. Rakover et al, Cognitive Psychology, vol. 21, pp. 423–464 (1989), To Catch a Thief with a Recognition Test: The Model and Some Empirical Results.
Patent Abstracts of Japan, vol. 018, No. 172 (P–1715) Mar. 23, 1994 & JP–A–05 334411 (Casio Computer Co., Ltd.) Dec. 17, 1993.

*Primary Examiner*—Jessica Harrison
*Assistant Examiner*—Michael O'Neill
*Attorney, Agent, or Firm*—Frishauf, Holtz, Goodman, Langer & Chick

[57] ABSTRACT

An electronic competing game apparatus utilizes article image data representative of human, animal, and housings to obtain a competing result of this game. In the electronic competing game apparatus, the respective portions of the article is designated by operating a designation unit, and a plurality of article images are displayed on a display unit. A competing result between the respective article images displayed on the display unit is judged by a judging unit based upon both point data corresponding to the partial images for constituting the respective article images, and point data corresponding to numeral data produced in an irregular sequence. When the designation unit is operated while the respective article images are attacking with each other, the irregularly set point data is added to the point data set to the respective article images. The competing results between the respective article images are determined based on the added point data.

22 Claims, 17 Drawing Sheets

FIG.3

BASIC PART PATTERN ROM 33

| PARTS | NO. | 01 | 02 | 03 | 04 | 20 |
|---|---|---|---|---|---|---|
| OUTLINE | 1 | | | | | |
| HAIR STYLE | 2 | | | | | |
| EYEBROWS | 3 | | | | | |
| EYES | 4 | | | | | |
| NOISE | 5 | | | | | |
| MOUTH | 6 | | | | | |

FIG.4

LIFE FORCE RECOVERY POINT ROM 36

| | | |
|---|---|---|
| 54a | ICON(1) | 40000 POINT |
| 54b | ICON(2) | 30000 POINT |
| 54c | ICON(3) | 27000 POINT |
| 54d | ICON(4) | 23000 POINT |
| 54e | ICON(5) | 20000 POINT |
| 54f | ICON(6) | 17000 POINT |
| 54g | ICON(7) | 13000 POINT |
| 54h | ICON(8) | 10000 POINT |
| 54i | ICON(9) | 5000 POINT |
| 54j | ICON(10) | 0 POINT |

FIG. 5

DISPLAY RAM

| DATA \ ITEM | INDIVIDUAL DATA | | | | MONTAGE DATA | | | | | | |
|---|---|---|---|---|---|---|---|---|---|---|---|
| | NAME | ADDRESS | TELEPHONE | AGE | OUTLINE | HAIR STYLE | NOSE | MOUTH | WEAR | RIGHT/LEFT HANDS | RIGHT/LEFT FEET |
| 1 | A | ○○ | ○○ | 40 | 101 | 202 | 504 | 601 | 703 | NONE | NONE |
| 2 | B | ○○ | ○○ | 30 | 105 | 206 | 503 | 604 | 705 | NONE | NONE |
| 3 | C | ○○ | ○○ | 15 | 110 | 211 | 515 | 618 | 720 | 820 | 920 |
| 4 | D | ○○ | ○○ | 20 | 105 | 220 | 510 | 611 | 710 | 815 | 914 |
| ⋮ | | | | | | | | | | | |
| 50 | Z | ○○ | ○○ | 50 | 110 | 215 | 520 | 615 | 712 | 815 | 920 |
| BASIC FIGHTING FORCE DATA | LIFE FORCE DATA | | | | 1 | 2 | 4 | 1 | 3 | NONE | NONE |
| | ATTACKING FORCE DATA | | | | 0 | 0 | 0 | 0 | 0 | NONE | NONE |
| | DEFENSIVE FORCE DATA | | | | 1 | 2 | 5 | 6 | 7 | NONE | NONE |
| FIGHTING FORCE COEFFICIENT | LIFE FORCE COEFFICIENT A | | | | ATTACKING FORCE COEFFICIENT B | | | | DEFENSIVE FORCE COEFFICIENT C | | |
| | LIFE FORCE (ESP) | | | | ATTACKING FORCE (PK) | | | | DEFENSIVE FORCE (TP) | | |
| DETERMINED FIGHTING POWER DATA | | | | | | | | | | | |
| DATA ON LIFE FORCE AFTER ATTACKING | | | | | | | | | | | |
| DATA IN LIFE FORCE AFTER RECOVERY | | | | | | | | | | | |

FIG. 17A < CASE WHERE FIRST COMPUTER FIGHTER LOST GAME >
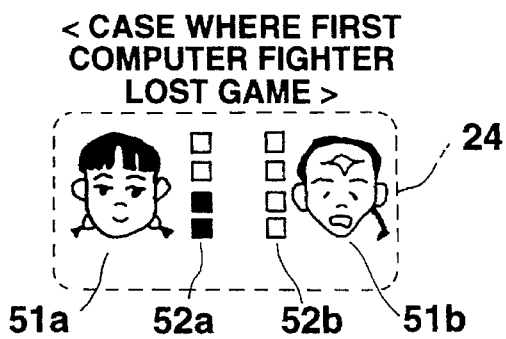
FIG. 17B
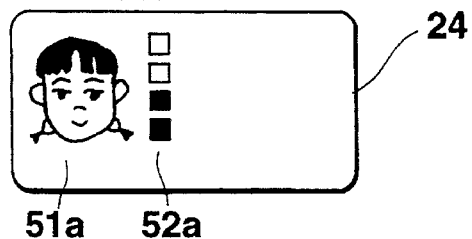
FIG. 17C
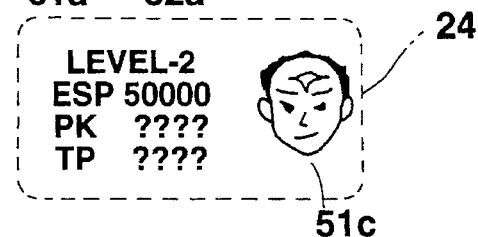
FIG. 17D < CASE WHERE SECOND COMPUTER FIGHTER LOST GAME >
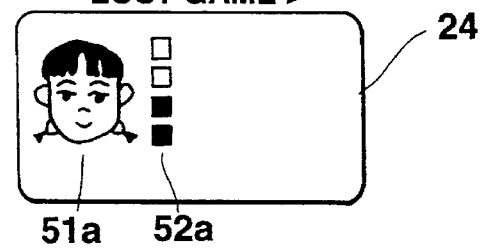
FIG. 17E < CASE WHERE SELECTED FIGHTER LOST GAME >
FIG. 17F
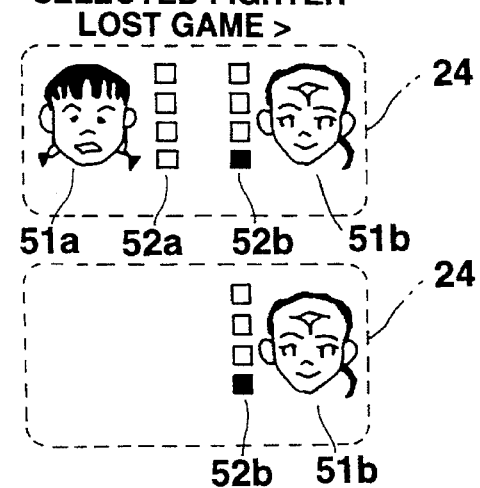

ELECTRONIC BATTLE GAME PLAYING APPARATUS WITH FACIAL MONTAGE GENERATION

BACKGROUND OF THE INVENTION

1. Field of the Invention

The present invention generally relates to an electronic game playing method and an electronic game playing apparatus for judging a competing result with employment of article image data such as human, animals and housings. More specifically, the present invention is directed to a method and an apparatus capable of electronically playing a battle game, while displaying a plurality of fighters whose life powers are selected by a user on a display screen.

2. Description of the Prior Art

Various sorts of game apparatuses with utilizing electronic appliances have been developed and are being marketed. For instance, the battle type television game apparatuses equipped with TV screens are widely spread. In the typical TV game apparatus, the game program data previously stored in the specific cassette tape magazine mounted on this TV game apparatus are read in response to the key operations, and then a user moves the character images displayed on the TV screen in accordance with this game program data, finally, the microcomputer judges the competing result between these character images.

In this conventional TV game apparatus, the data used to judge the competing result are such data previously set in this cassette magazine as a portion of the game program. As a result, the conclusions of this competing result are predetermined, so that amusing TV game cannot be expected.

To solve the above-explained drawback, U.S. patent application Ser. No. 148,975 entitled to T. MASE et al., "IMAGE DATA PROCESSOR" assigned to the same assignee as that of the present U.S. patent application, has proposed such an electronic game apparatus for playing the battle game with use of the article image data, e.g., a plurality of human, animals, or housings. In this electronic game apparatus, a plurality of article image data are produced by combining the portional image data with each other with regard to the respective portions, and a decision is made of the competing result between the respective article images based upon a comparison result in the magnitudes of the point data set in correspondence with the respective portion image data for constituting these plural article images.

However, there is a recent trend that users want to enjoy the battle game with great flexibility. That is, since the competing result between the respective article images is determined based upon the comparison result in the magnitudes of the point data set in correspondence with the respective partial image data which constitute the respective article image data, the same point data are always allocated to the specific article image constructed from the same partial image data. As a consequence, while any users continuously utilize the same electronic game apparatus, they can gradually become aware of the competing results with respect to the same article image, so that they may not deeply enjoy this battle game with their great fun.

SUMMARY OF THE INVENTION

The present invention has been made in an attempt to solve the above-described problems, and therefore, has an object to provide a novel electronic game playing method and an apparatus capable of playing a game with great fun.

Another object of the present invention is to provide an electronic game playing method and an apparatus capable of obtaining an unexpected competing result.

A further object of the present invention is to provide an electronic game playing method and an apparatus capable of reflecting sufficient intention of a game player in the game.

To achieve these objects, a method for electrically playing a competing game on a display unit, according to one aspect of the present invention, is featured by comprising the steps of:

producing a plurality of numeral data having different values in an irregular sequence;

setting a plurality of article image data constructed by combining portion image data with each other corresponding to respective portions of articles;

judging a competing result between a plurality of article images represented by said plurality of article image data based upon both point data set in correspondence with the portion image data for constituting said article image data, and point data corresponding to said numeral data; and displaying said competing result between said article images on the display unit.

Furthermore, an electronic game apparatus for electronically playing a competing game, according to another aspect of the present invention, is featured by comprising:

numeral data generating means for generating a plurality of numeral data having different values in an irregular sequence;

setting means for setting a plurality of article image data constructed by combining portion image data with each other corresponding to respective portions of articles;

judging means for judging a competing result between a plurality of article images represented by said plurality of article image data based on both point data set in correspondence with the portion image data, and point data corresponding to said numeral data; and display means for displaying said competing result between said article images.

The above-described display means may be selected from a liquid crystal display device, a printer, and the like which can visually represent the competing result.

According to the present invention, a plurality of article image data made of combinations of the partial image data corresponding to the respective portions of the article may be set by the setting means. Subsequently, the competing result between the plural article images set by this setting means may be judged by the judging means based on both the point data set in correspondence with the partial image data for constituting this article image, and the point data corresponding to the numeral data generated from the numeral value data generating means in such an irregular sequence. This judgement result is displayed on the display means. In this case, the judgement result may be made by taking account of the point data corresponding to the numeral data generated by the numeral value data generating means in the irregular sequence in addition to the point data set in correspondence with the partial image data for constituting the respective article image data. As a result, the unexpected competing results between the plural article images could be achieved in the above-defined electronic game playing apparatus/method according to the present invention.

BRIEF DESCRIPTION OF THE DRAWINGS

For a better understanding of the present invention, reference is made of the following detailed description to be read in conjunction with the accompanying drawings, in which:

FIG. 3 schematically illustrates storage conditions of basic part patterns stored in a basic part pattern ROM;

FIG. 4 schematically shows storage conditions of life force recovery points stored in a life force recovery point ROM;

FIG. 5 schematically shows storage conditions of various sorts of data stored in a RAM;

FIGS. 17A to 17F schematically indicate display conditions appearing in the respective win/lose determining stages during the battle Game process.

DETAILED DESCRIPTION OF THE PREFERRED EMBODIMENTS

Referring now to drawings, a montage battle Game apparatus according to a presently preferred embodiment of the present invention will be described.

OVERVIEW OF MONTAGE BATTLE GAME APPARATUS

Figure 1:
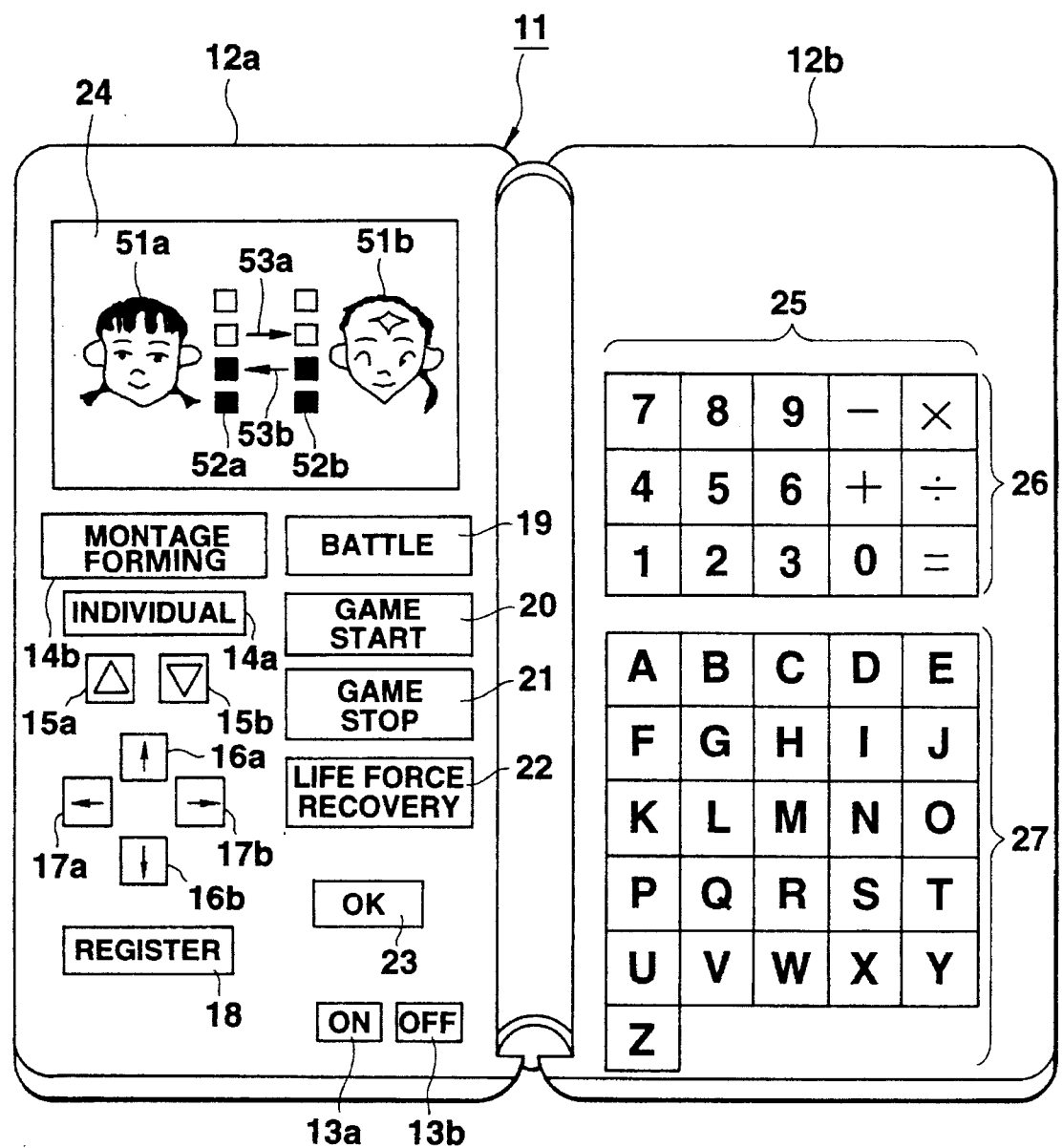
FIG. 1 is an outer view of a montage battle game machine according to an embodiment of the present invention.

FIG. 1 schematically shows an outer view of a notebook type montage battle game apparatus 11 to which the present invention has been applied.

The montage battle game apparatus 11, as illustrated and viewed in FIG. 1, owns a notebook type housing operable in the right/left directions. That is, this notebook type housing is constructed of a left operation plane 12a and a right operation plane 12b. On the left operation plane 12a, there are provided: an ON key 13a and OFF key 13b used to turn ON/OFF a power source (not shown in detail); an individual key 14a operated when an individual data input mode is set; and a montage forming key 14b manipulated when a montage forming mode is set. This left operation plane 12a of the montage battle game apparatus further contains basic montage selection switches 15a and 15b operated when the basic montage made of combinations of various basic part patterns previously stored is selected to form a desired montage; keys 16a and 16b manipulated as part designation keys when a part to be changed is designated to form a desirable montage, and also as fighter selection keys when a fighting fighter is selected during the battle game; and pattern selection keys 17a and 17b operated when a part pattern about the part to be changed, which has been designated as the part to be changed; during the formation of the above-explained desired montage. This left operation plane 12a further includes a register key 18 operated when either the entered individual data, or the formed montage pattern is reserved; a battle key 19 manipulated when a battle fighter register is set; a game start key 20 operated when a battle game is started; a game stop key 21 operated when the battle game is stopped, or ended; a life force recovery key 22 operated when a life force recovery mode is set by which life force of a selected fighter is recovered during a battle game; and an OK key 23 manipulated as a selection/execution key in the respective battle fighter register mode, battle game mode, and life force recovery mode.

Also, a liquid crystal dot matrix display unit 24 is provided on the left operation plane 12a of the main body of this game apparatus 11.

As illustrated in FIG. 1, the liquid crystal dot matrix display unit 24 is mainly arranged by one montage display area used to display a selected fighter 51a which has been registered by a user in the battle fighter register mode in response to the key operation of the above-described battle key 19, and the other montage display area used to display a computer fighter 51b which has been previously registered. Furthermore, there are provided inbetween these display areas, a life force display bar 52a for the selected fighter, used to display a remaining amount of life force of each fighter; another life force display bar 52b for life force of the computer fighter, and attacking arrows 53a, 53b indicative of attacking directions of the respective fighters.

On the other hand, the right operation plane 12b of the game apparatus body 11 contains numeral entry keys ("0" to "9") 25 operated when a numeral value is entered; operator keys 2b; and alphabetical keys 27 used to enter individual data and various sorts of data.

ELECTRONIC CIRCUIT OF MONTAGE BATTLE GAME APPARATUS

Figure 2:
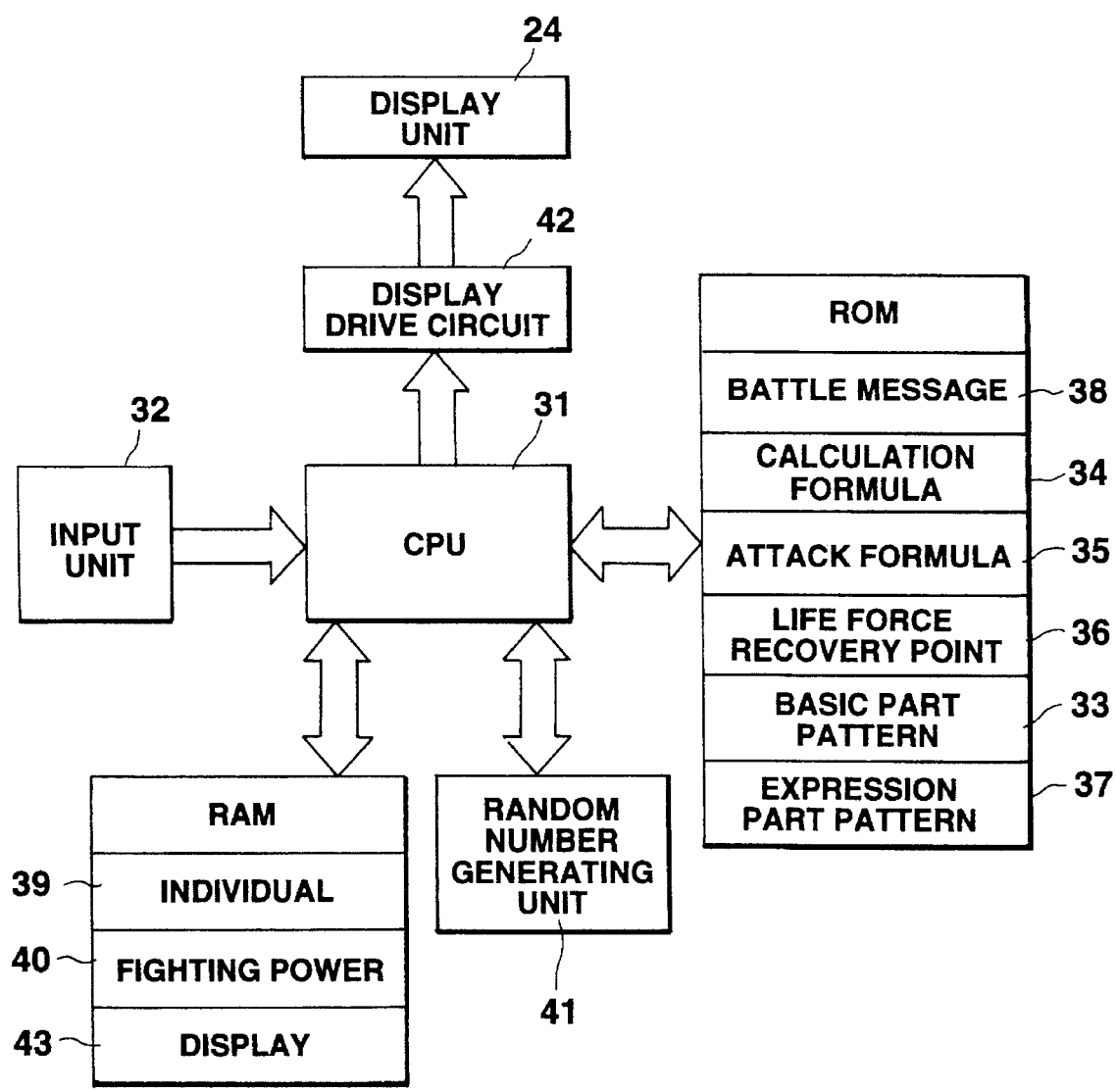
FIG. 2 is a schematic block diagram for representing an overall arrangement of an electronic circuit employed in the montage battle game machine shown in FIG. 1.

FIG. 2 is a schematic block diagram for showing an overall circuit of the above-explained montage battle game apparatus according to the first embodiment of the present invention.

This montage battle game apparatus includes a CPU (central processing unit) 31. The CPU 31 performs operation controls of various circuit units in accordance with the previously stored program in response to various key operation signals supplied from the input unit 32 provided on the left operation plane 12a and the right operation plane 12b. To this CPU 31, there are connected in addition to the above-explained input unit 32, a basic part pattern ROM 33;

a calculation formula ROM 34; an attack formula ROM 35; a life force recovery point ROM 36; an expression part pattern ROM 37; a battle message ROM 38; individual data RAM 39, fighting power data RAM 40; a random number generating unit 41; and via a display drive unit 42 to the above-described liquid crystal dot matrix display unit 24.

VARIOUS DATA/PART PATTERN STORAGE CONDITIONS

FIG. 3 schematically represents storage conditions of basic part patterns previously stored in the basic part pattern ROM 33.

20 sorts of part patterns have been stored into preselected storage areas numbered by No. 01 to NO. 20 in this basic part pattern ROM 33. That is, 9 sorts of various parts components such as an outline, a hair style, eyebrows, eyes, a nose and a mouth are prepared for constituting various images of human, animals and a creature from outer space with respect to 20 sorts of parts patterns.

In this case, 20 sorts of predetermined basic montage images may be produced by combining the part patterns corresponding to the respective parts (outline, hair style, eyebrows, eyes, nose, mouth) in the basic part patterns No. 1 to No. 20 stored in the basic part pattern ROM 33.

FIG. 4 schematically indicates storage conditions of life force recovery points previously stored in the life force recovery point ROM 36.

Icons 54a to 54j corresponding to 10 sorts of image pattern data, which are selected by a user in the life force recovery mode, and also life force recovery points having present different values corresponding to these different pictorial icons 54a to 54j, are previously stored in this life force recovery point ROM 36.

FIG. 5 schematically shows storage conditions of various data temporarily stored in the above-described RAMs.

That is, the RAMs include the individual data RAM 39, the fighting power data RAM 40, and the display RAM 43. This individual data RAM 39 is arranged by an individual data register 39a and a montage data register 39b.

The individual data register 39a is designated to store therein the individual data about 50 individuals which are arbitrarily inputted during the individual data input data. Each of these individual data is constructed of a name, an address, a telephone number, and an age. The montage data register 39b is designated to store therein montage data corresponding to the respective individual data in the montage forming mode by combining part pattern numbers which correspond to a plurality of part patterns for constituting various montages (pictorial images).

In this case, the part numbers representative of the various parts (portions) are stored as the upper digit, whereas the part pattern numbers are stored as the lower digit. For instance, in case of individual data "A", since the portion of the outline is "1", and the selected part pattern number is "01", the montage data about this outline becomes "101". Furthermore, since the portion of the hair style is "2", and the selected part pattern number is "02", the montage data about this hair style becomes "202". Thus, the part numbers may be stored as the montage data for the respective parts in such a manner.

On the other hand, the fighting power data RAM 40 is arranged by a basic fighting power data register 40a, a fighting power determining coefficient register 40b, a determined fighting force data register 40c, a data register 40d for life force after attacking, and a data register 40e for life force after recovery.

The basic fighting force data register 40a stores therein fighting force data which constitutes a base of a selected fighter, and has been registered by a user in the battle fighter register mode. The fighting power data is classified into life force data, attacking force data, and defensive force data, which will then be stored into the basic attacking force data register 40a. In this case, two digits of the lower digit portion of the corresponding montage data are allocated to the life force data and the attacking force data, whereas the first digit of the upper digit portion thereof is allocated to the defensive force data.

For example, when an "A" is registered as the selected fighter in the individual data RAM 39, since the montage data corresponding to the portion of the outline is "101", the above-described fighting power data becomes "1", "0", "1" in the order of the defensive force data, the attacking force data, and the life force data. Also, since the montage data corresponding to the portion of the hair style is "202", the above-mentioned fighting power data becomes "2", "0", "2" in the order of the defensive force data, the attacking force data, and the life force data. These numeral values are stored as the respective data.

Then, the fighting power determining coefficient register 40b is subdivided into a life force coefficient register 40b1, an attacking force coefficient register 40b2, and a defensive force coefficient register 40b3. Into the life force coefficient register 40b1, the first digit value of the total value about the life force data allocated to the basic fighting power data register 40a is stored as the life force determining coefficient "A" of the selected fighter. Into the attacking force coefficient register 40b2, the first digit value of the total value about the attacking force data is stored as the attacking force coefficient "B" of the selected fighter. Furthermore, into the defensive force coefficient register 40b3, the first digit value of the total value of the defensive force data is stored as the defensive force determining coefficient "C" of the selected fighter.

When the total value of the life force data stored in the basic fighting power data register 40a is, for instance, "123", the above-explained life force determining coefficient "A" is "3" corresponding to the first digit value of this total value "123". When the total value of the attacking force data stored in the basic fighting power data register 402 is, for example, "26", the attacking force determining coefficient "B" is "6" corresponding to the first digit value of this total value "26". Also, when the total value of the attacking force data stored in the basic fighting power data register 40a is, e.g., "135", the attacking force determining coefficient "C" is "5" corresponding to this total value of "135".

Also, the determined fighting power data register 40c is subdivided into a life force data register 40c1, an attacking force data register 40c2, and a defensive force data register 40c3. Into the respective registers 40c1, 40c2, and 40c3, life force data (ESP) of the selected fighter, attacking force data (PK) thereof, and defensive force data (TP) thereof are stored which have been calculated based on a calculation formula for determining the fighting power data previously stored into the calculation formula ROM 34. In this case, the calculation formula to determine the life force is given by the below-mentioned formula (1):

$$\text{Life force data } (ESP) = \text{Life force determining coefficient "A"} \times 10,000 \quad (1).$$

The calculation formula to determine the attacking force is given by the following formula (2):

Attacking force data $(PK)$=Attacking force determining coefficient "B"×1,000 (2).

Further, the calculation formula to determine the defensive force is given by the following formula (3):

Defensive force data $(TP)$=Defensive force determining coefficient "C"×1,000 (3).

As a consequence, when the life force determining coefficient "A" is "3", which is stored in the fighting power determining coefficient register 40b in correspondence with the selected fighter "A", the life force data (ESP) thereof becomes (30,000) calculated based on the above-explained formula (1). When the attacking force determining coefficient "B" is "6", the attacking force data (PK) thereof becomes (6,000) calculated based upon the above-described formula (2). Furthermore, when the defensive force determining coefficient "C" is "5", the defensive force data (TP) becomes (5,000) calculated based on the above-mentioned formula 3. These numeral values are stored into the respective registers 40c1 to 40c3 for constituting the determined fighting force data register 40c.

The data register 40d for life force after attacking stores therein the remaining amount of the life force data after the attacking from the confronted fighter. In this case, the remaining amount of the life force after the respective fighters have attacked, is calculated based on a calculation formula (4) about the life force data after attacking, which has been previously stored in the attacking formula ROM 35:

Life force data after attacking=Life force before attacking−Attacking point for confronted fighter (BP) (4).

It should be noted that the attacking point for attacking fighter (BP) may be calculated based on the following formulas (5) and (6). The first formula (5) is a basic value calculating formula which has been previously stored in the attacking formula ROM 35:

Basic value=Attacking force data for attacking fighter×(1−Defensive force for confronted fighter/20,000)×4 (5).

Also, the second formula (5) is an attacking point calculating formula:

Attacking point (BP)=Basic value×Random numeral value (6).

The data register 40e for life force after recovery stores therein the life force data recovered in accordance with the life force recovery point (refer to FIG. 4) selected in the life force recovery mode. This life force data after recovery is updated as life force data (ESP) of the determined fighting force data register 40c.

Here, the above-described life force after recovery is calculated based on a life force recovery formula (7) previously stored in the calculation formula ROM 24:

Life force after recovery=Original life force+Life force recovery point (7)

That is, both of the newly entered individual data and the montage data thereof are stored in the individual data RAM 39. The fighting power of the selected fighter is stored as the life force data (ESP), the attacking force data (PK), and the defensive force data (TP) in the fighting power data RAM 40.

It should be understood that a plurality of montage data about the fighters on the side of the computer, who are confronted with the fighters selected by the user, have been previously stored in a ROM (not shown), and then the fighting power data, the respective determining coefficients for life force, attacking force, and defensive force, and the various data about life force data (ESP), attacking force data (PK), defensive force data (TP), and the life force after attacking data, which belong to the computer fighters successively selected as the confronted fighters, can be obtained in a similar manner to those of the above-described selected fighters.

On the other hand, display part patterns at the respective battle win/lose determining stage have been stored in the expression part pattern ROM 37. That is, face expression changing part patterns corresponding to the eyes and mouth basic part patterns in the basic part pattern ROM 33 have been previously stored.

Also, win/lose messages varied in response to the battle results have been stored in the battle message ROM 38 in addition to the message data required during the battle game. For instance, a message "You did it!" has been previously stored as the message displayed in combination with the face montage for the winner, and another message "Sorry, try again!" has been previously stored as the message displayed in combination with the face montage for the loser.

On the other hand, the respective part patterns read out from the basic part pattern ROM 33 are synthesized in correspondence with the part pattern numbers for the respective parts which constitute the montages of the selected fighters and the computer fighters stored in the corresponding individual data RAM 39 and computer fighter ROM (not shown), and thereafter the combined part patterns are stored in the display RAM 43. A portrait image and the like are supplied via the display drive circuit 42 to the liquid crystal dot matrix display unit 42 as to be displayed thereon adjacent to the above-described part patterns (see FIG. 1).

OVERALL PROCESS OPERATION OF MONTAGE BATTLE GAME APPARATUS

Overall process operation of the above-described montage battle game apparatus with these arrangements will now be described with reference to a flow chart shown in FIG. 6.

Before executing the montage battle game, an input/register process operation (see FIG. 7) of individual data is carried out at a first step X1. At this step X1, arbitrary individual data is inputted as his name, address, telephone number, and age. At the next step X2, a montage forming process operation (see FIG. 8 and FIG. 9) is carried out, in which a portrait image of the respective individual data is formed and montage data corresponding to this individual data is registered.

Thereafter, at a step X3, a battle fighter register process operation (see FIG. 10 and FIG. 11) is performed, and furthermore another process operation is executed so as to set fighting power data about a selected fighter and a computer fighter. After the above-described various process operations have been executed, a battle game process operation (see FIG. 12 to FIG. 15) is carried out at a step X4. At this step X4, the battle game for the above-explained selected fighter battled with the computer fighter.

This battle game is performed until the game stop key 21 is manipulated by repeatedly executing the above-explained battle game process operation (steps X5 to X4).

INDIVIDUAL DATA INPUT/REGISTER PROCESS OPERATION

Figure 6:
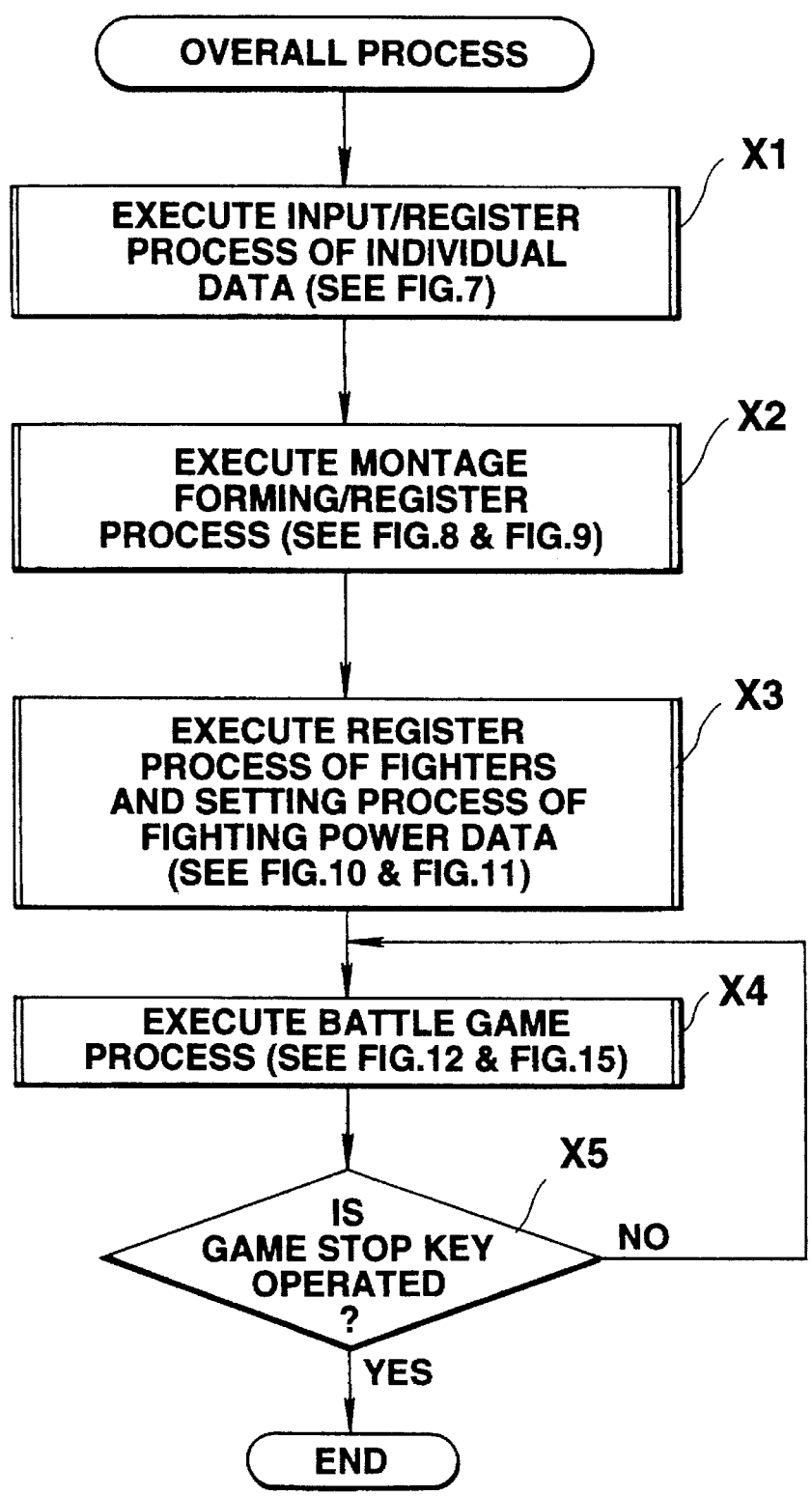
FIG. 6 is a flow chart for explaining an overall process operation of the montage battle game machine shown in FIG. 1.
Figure 7:
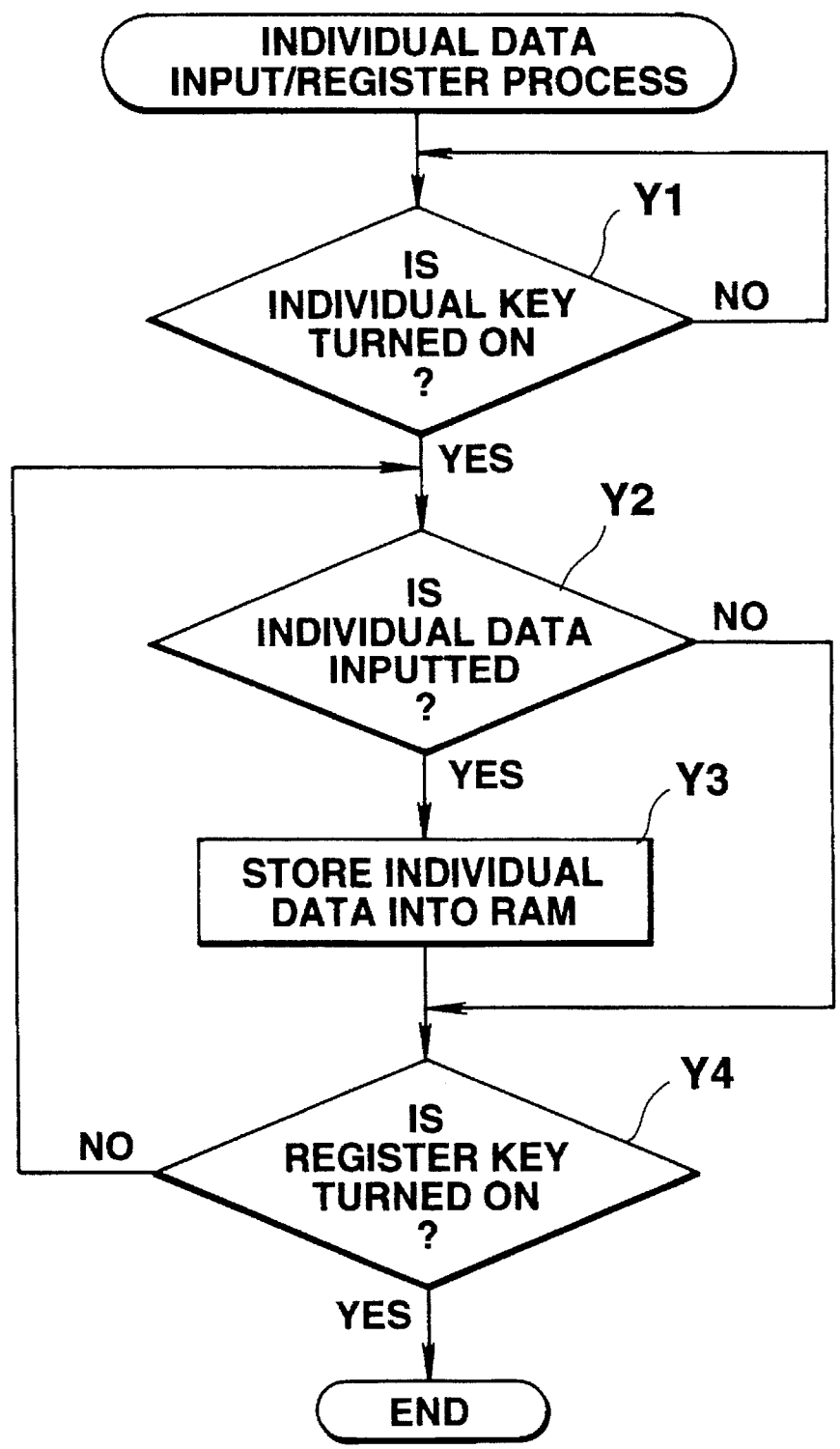
FIG. 7 is a flow chart for explaining an input process operation of individual data.

In FIG. 7, there is shown a flow chart for explaining the contents of the above-described individual data input/register process operation as defined at the step X1 of FIG. 6.

At a first step Y1 of this flow chart, when a judgement result is made that the individual key 14a in the input unit 32 is operated, the CPU 31 sets the operation mode to the individual data input mode. In this individual data input mode, when it is so judged at a step Y2 that such individual data as a name, an address, a telephone number, and an age are entered in accordance with the operations of the numeral entry key 25 and the alphabet entry key 27, these entered individual data are sequentially stored into the individual data register 39a in the individual data RAM 39 at a step Y3.

At the subsequent step Y4, when the register key 18 is manipulated, the individual data input mode is released, so that registers of the respective individual data stored in the individual data register 39a are confirmed.

MONTAGE FORMING/REGISTER PROCESS OPERATION

Figure 8:
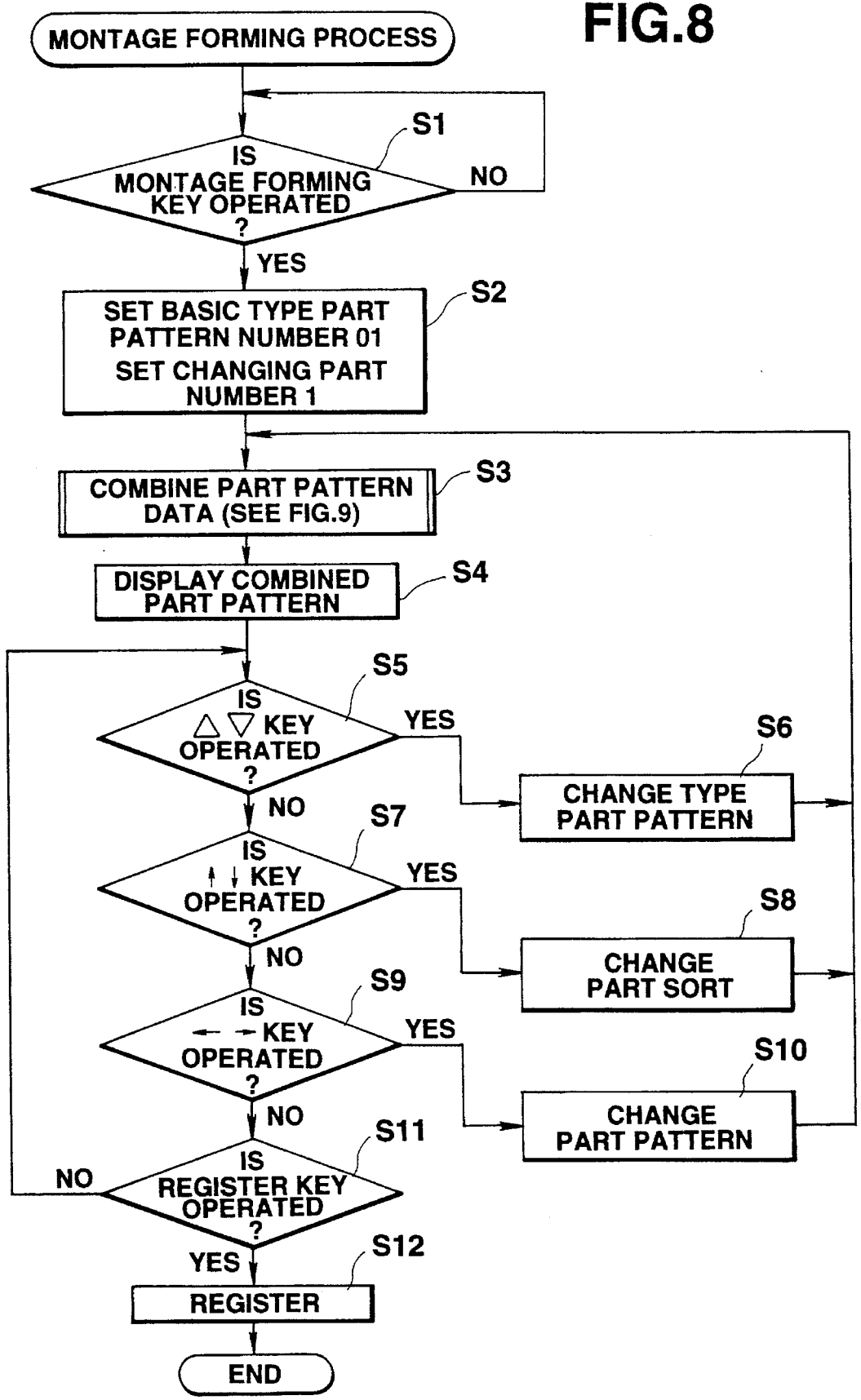
FIG. 8 is a flow chart for explaining a montage forming process operation.

FIG. 8 is a flow chart for representing the contents of the above-explained montage forming/register process operation as defined in the step X2 of FIG. 6.

At a first step S1 of this flow chart, when the montage forming key 14b employed in the input unit 32 is operated, the operation mode of the CPU 31 is brought into the montage forming mode.

When the montage forming mode is in effective, the part pattern number "01" corresponding to the respective part patterns for constituting the first basic type montage image is set to the basic part pattern ROM 33 (see FIG. 3) at a step S2. Also, the first part number (namely, part number of outline in this case) is set as the part used to change the pattern.

As a consequence, the respective part patterns corresponding to the first basic type montage image are read out from the basic part pattern ROM 33. Thereafter, these read part patterns are transferred to the display RAM 43 and are combined with each other at the next step S3. As a result, the combined part patterns are displayed as the first basic type montage image on the liquid crystal dot matrix display unit 24 at a step S4.

Figure 9:
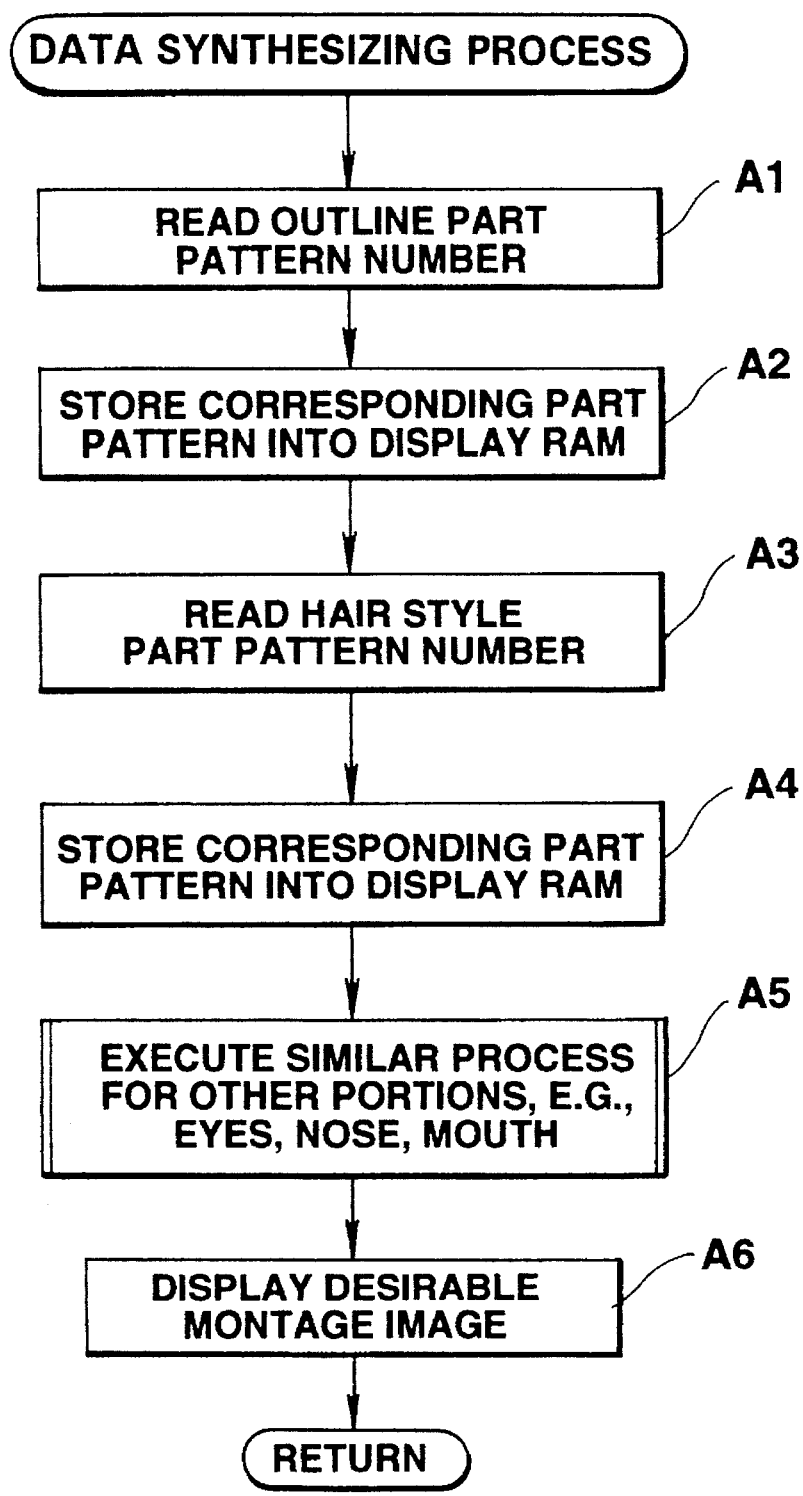
FIG. 9 is a flow chart for representing a data synthesizing process operation executed in conjunction with the above-explained montage forming process operation.

Referring now to a flow chart of FIG. 9, a detailed process operation of the above-described data combining (synthesizing) process operation as defined at the previous step S3 of FIG. 8 will be explained.

In this data synthesizing process, when the part pattern numbers of the respective parts are designated to the basic part pattern ROM 33 in order to constitute the first basic type montage image, the part pattern data corresponding to the designated part pattern numbers are read out from the basic part pattern ROM 33, and then are transferred to the display RAM 43 in which the contents of these part pattern data are synthesized with each other (steps A1 to A5).

In this case, the respective part patterns such as the outline, eyes, and nose which constitute the first basic type montage image are sequentially synthesized in the display RAM 43. As a result, with respect to this initial setting operation, the first basic type montage image constructed by the respective parts and the respective part patterns corresponding to the part pattern number "01", is displayed on the liquid crystal dot matrix display unit 24 (step A6).

Under this condition, when the basic montage selecting key 15b employed in the input unit 32 is operated, all of the respective part pattern numbers for designating the basic type montage image to the basic part pattern ROM 33 are changed from "01" to "02" (steps S5 and S6).

As a consequence, in accordance with the changed part pattern number "02", after the respective part pattern data stored in the basic part pattern ROM 33 have been read out (in this case, all numbers are "02"), the transfer/synthesizing process operation of the respective part patterns with respect to the display RAM 43 is carried out. Accordingly, the second basic type montage image is displayed on the liquid crystal dot matrix display unit 24 at the steps S3 and S4. This second basic type montage image is constructed by synthesizing the part patterns corresponding to the part pattern number "02" which involves all of the part patterns from the outline part pattern to the mouth part pattern.

When the basic montage selection keys 15a and 15b employed in the input unit 32 are sequentially operated, the process operation defined at the steps S3 to S6 is repeatedly carried out, so that 20 sorts of basic type montage images previously stored as the part pattern numbers of "01" to "20" in the basic part pattern ROM 33 are sequentially changed and sequentially synthesized with each other, and finally are displayed.

As a consequence, the user can previously select either such a desirable montage image itself, or one basic type montage image similar to this desirable montage image to be displayed on the liquid crystal dot matrix display unit 24.

Under this display condition, when the part designation keys 16a and 16b employed in the input unit 32 are operated, the parts whose patterns should be changed, will be changed into other parts. For instance, when a specific part (for example, outline part) among the basic type montage images selectively and previously displayed on the liquid crystal dot matrix display unit 24 by executing the process operation defined at the steps S3 to S6, is desired to be changed into another different part (e.g., hair part), this specific part is changed by operating the part designation keys 16a and 16b (steps S7 and S8).

Thereafter, when the pattern selection keys 17a and 17b are operated, the part pattern is changed among the corresponding parts of the basic part pattern ROM 33, which are designated as the parts to be changed. This changed part pattern is read out from the basic part pattern ROM 33 and then transferred to the display RAM 43. Thus, the presently displayed part pattern on the liquid crystal display unit 24 may be substituted by the transferred part pattern, and then this transferred part pattern is displayed thereon (steps S9, S10, to S3, S4). As a consequence, the user may change the desired part into another different part among the basic type montage images selectively, previously displayed on the liquid crystal display unit 24, and then may display this different part on this display unit 24.

Furthermore, when this different part is changed into the other part pattern, the part designation keys 16a and 16b are operated to change the part to be change. Thereafter, the pattern selection keys 17a and 17b are operated to change the part pattern number, whereby the part among the presently displayed basic type montage images is changed into other part pattern, and then a desired montage image can be finally formed. At the steps S5 through S10, for instance, as the respective part patterns of the montage image corresponding to the individual data "A", the outline part pattern is selected as "01"; the hair style part pattern is selected as "02"; . . . , the nose part pattern is selected as "04"; the mouth part pattern is selected as "01"; and also the wear part pattern is selected as "03". After the montage image desired by the user could be obtained, when it is judged at a step S11 that the register key 18 of the input unit 32 is operated, the part pattern numbers corresponding to the respective part patterns for constituting the synthesized montage image in the display RAM 43 are registered into the montage data register 39b within the individual data RAM 39 as the montage data corresponding to, for instance, the first individual data "A" at the step S12.

REGISTER PROCESS OPERATION OF BATTLE FIGHTER

Figure 10:
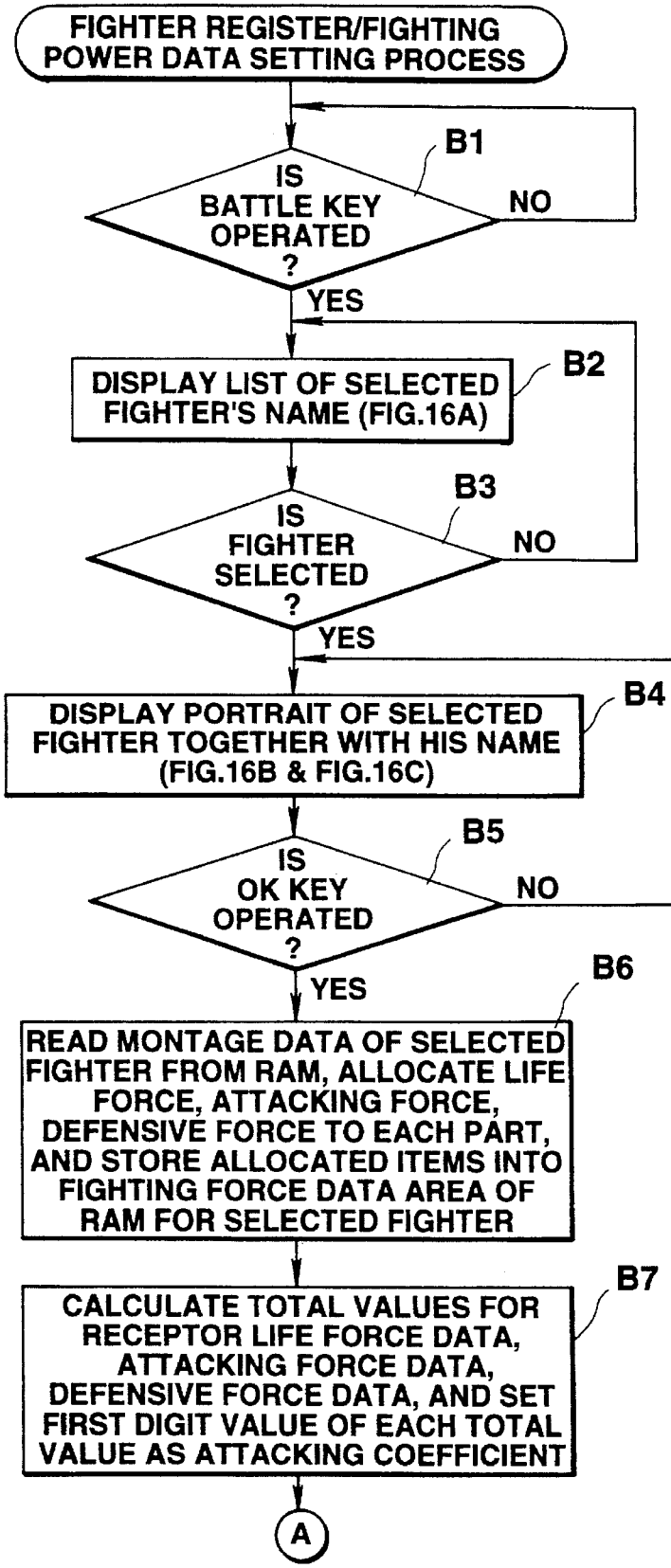
FIG. 10 is a flow chart for explaining a front half process operation about registering process of battle fighters/setting process of fighting power.
Figure 11:
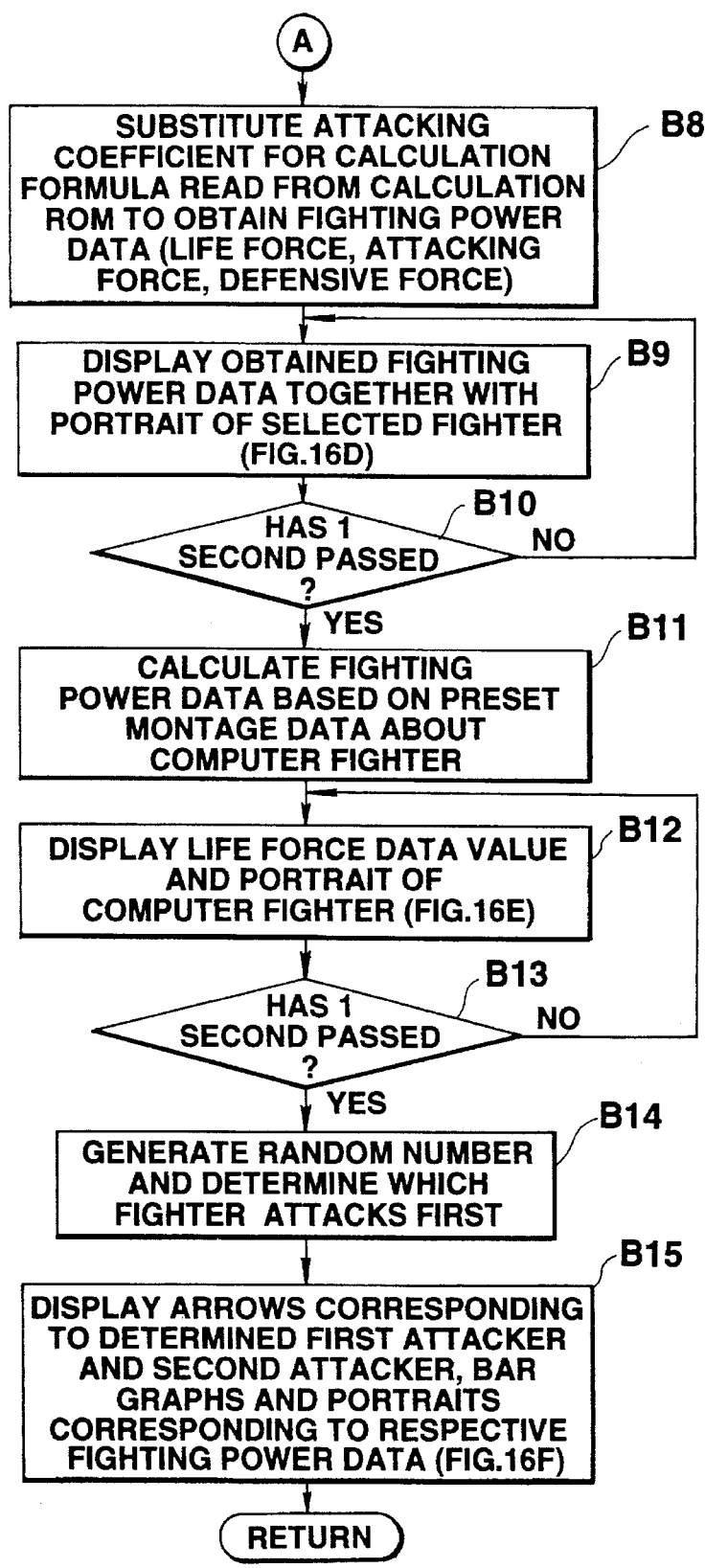
FIG. 11 is a flow chart for explaining a rear half process operation about registering process of battle fighters/setting process of fighting power.

FIG. 10 and FIG. 11 are flow charts for explaining the detailed contents of the battle fighter register process operation as defined at the above-described step X3 shown in FIG. 6.

Figure 16A:
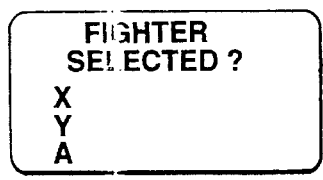
FIGS. 16A to 16N schematically represent display conditions appearing during the battle fighter registering process, the battle game process, and the life force recovery process.

At a first step B1 of the flow chart shown in FIG. 10, when a judgement result is made that the battle key 19 employed in the input unit 32 is operated during the battle fighter register process operation, the operation mode of the CPU 31 is set to the battle fighter register mode. Thereafter, the names of the respective individual data stored in the individual data register 39a of the individual data RAM 39 are transferred to the display RAM 43 in a predetermined format at the next step B2. Then, as shown in FIG. 16A, these individual names are displayed as a list of fighters to be selected, on the liquid crystal dot matrix display unit 24 in combination with such a character data "IS FIGHTER SELECTED" read out from the battle message ROM 38.

Figure 16B:
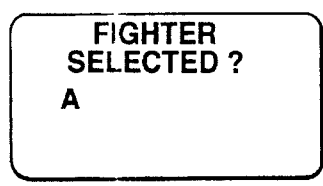

Under such a display condition, the fighter selection keys 16a and 16b are operated at a step B3 to select "A" as the selected fighter 51a, as illustrated in FIG. 16B. Accordingly, the montage data corresponding to this individual name "A" is read out from the montage data register 39b of the individual data RAM 39 at a step B4, so that a portrait of this selected fighter 51a is displayed in combination with his name "A" (see FIG. 16C).

In case of this portrait, since the respective part pattern numbers stored in the montage data register 39b in correspondence with the selected fighter whose name is "A", are given such that the outline is "01", the hair style is "02", . . . , the nose is "04" the mouth is "01", . . . , the corresponding part patterns are read out from the basic part pattern ROM 33 in accordance with these part pattern numbers. Then, the read part patterns are synthesized with each other in the display RAM 43 and the synthesized part patterns are displayed on the display unit 24.

Figure 16C:
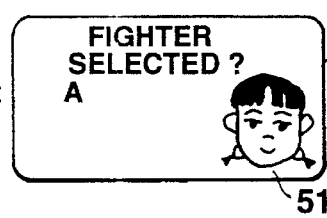

Under such a condition that, as represented in FIG. 16C, the selected fighter 51a whose name is "A" is selected and his portrait is displayed, when the OK key 23 is manipulated at a step B5, the montage data "101", "202", . . . , "504" and "601" corresponding to this selected fighter 51a having his name of "A" are read out from the montage data register 39b. At the next step B6, these read montage data are allocated and stored into the basic fighting power data register 40a of the fighting power data RAM 40 as the life force data, the attacking force data, and the defensive force data for the respective parts.

At the next step B7, a total value of each of the life force data, the attacking power data, and the defensive force data of the selected fighter stored in the basic fighting power data register 40a is calculated by the CPU 31. Then, the first digit values of the respective total values are stored as the life force determining coefficient "A", the attacking force determining coefficient "B", and the defensive force determining coefficient "C" into the relevant coefficient registers 40b1 to 40b3 in the fighting power determining coefficient register 40b.

Thus, when the respective fighting power determining coefficients "A", "B", "C" could be obtained, calculations are performed for the life power data (ESP), the attacking power data (PK), and the defensive force data (TP) about the selected fighter 51a based on the life power determining calculation formula (formula 1), the attacking force determining calculation formula (formula 2), and the defensive force determining calculation formula (formula 3), which have been previously stored into the calculation formula ROM 34 at a step B8. The resultant data ESP, PK, TP are stored into the corresponding registers 40c1 to 40c3 in the determined fighting power data register 40c.

Figure 16D:
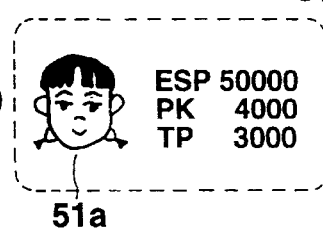

At the next step B9, as represented in FIG. 16D, these calculated data of the selected fighter 51a about the life force (ESP), the attacking force (PK), the defensive force (TP) are displayed in combination with the portrait of this selected fighter 51a on the liquid crystal display unit 24.

After the selected fighter by the user is registered in the above-described manner to set the fighter power data thereof, when it is judged at a step B10 that a lapse of 1 second is counted by a timer built in the CPU 31, the montage data corresponding to the first computer fighter is read from plural sets of the montage data previously stored in a montage ROM (not shown) for the computer fighter. Then, the various fighting power data ESP, PK, TP about this first computer fighter are calculated based on the read montage data in a similar manner to that of the above-described selected fighter at the subsequent step B11.

Figure 16E:
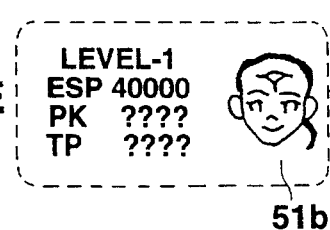

Thereafter, at a step B12, only the life force data (ESP) among the fighting power data of the computer fighter 51b is displayed on the liquid crystal display unit 24 in combination with the portrait of this computer fighter 51b synthesized based on the montage data corresponding to the first (LEVEL-1) computer fighter, as represented in FIG. 16E. Both the attacking force data (PK) and the defensive force data (TP) other than this life force data (ESP) are not displayed, but symbol data of "????" are alternatively displayed.

Thereafter, when at a step B13, it is so judged that a lapse of 1 second is counted by the timer built in the CPU 31, the random numbers of 0 to 9 are generated by the random number generating unit 41 at a step B14. Depending upon such a fact as to, for instance, whether the generated random number corresponds to the even number, or the odd number, a decision is made who is the first attacker for the above-described selected fighter 51a and computer fighter 51b.

Figure 16F:
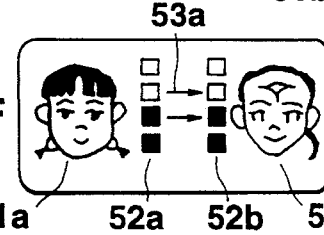

At the next step B15, as shown in FIG. 16F, a life force representing bar 52a for the selected fighter 51a and a life force representing bar 52b for the computer fighter 51b, which indicate remaining amounts of the respective life force based on these life force data (ESP), are displayed in addition to the respective portraits of the fighters 51a and 51b. In correspondence with the above-described first attacker decision, an attacking arrow 53a indicative of the attacking direction between these fighters is displayed. In case of FIG. 16F, the attacking arrow 53a indicates that the selected fighter is the first attacker.

As described above, when the user selected fighter and the computer fighter are registered, such a condition that the battle game can be performed can be established.

BATTLE PROCESS OPERATION

Figure 12:
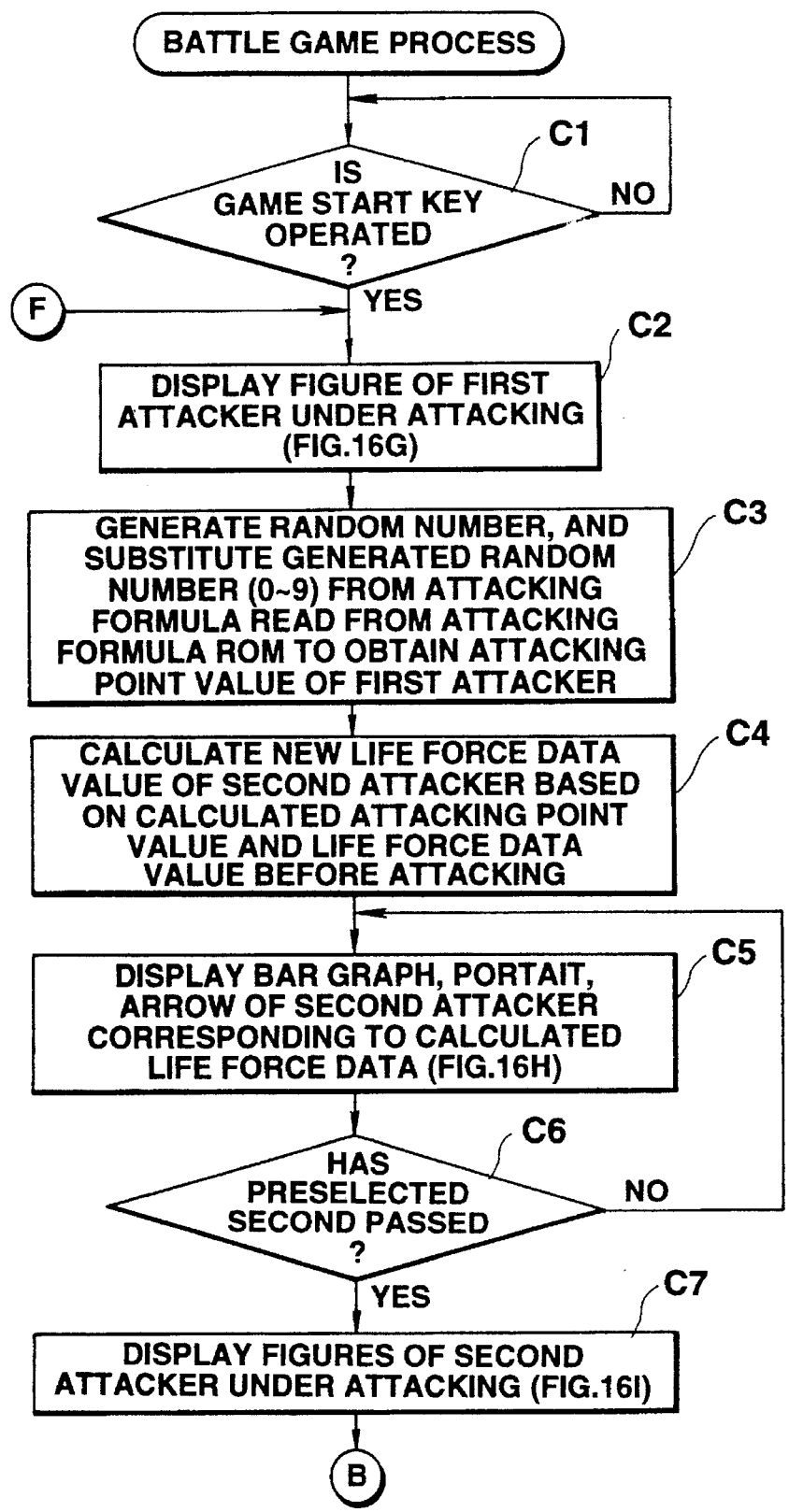
FIG. 12 is a flow chart for indicating a front stage of the battle Game process operation.
Figure 13:
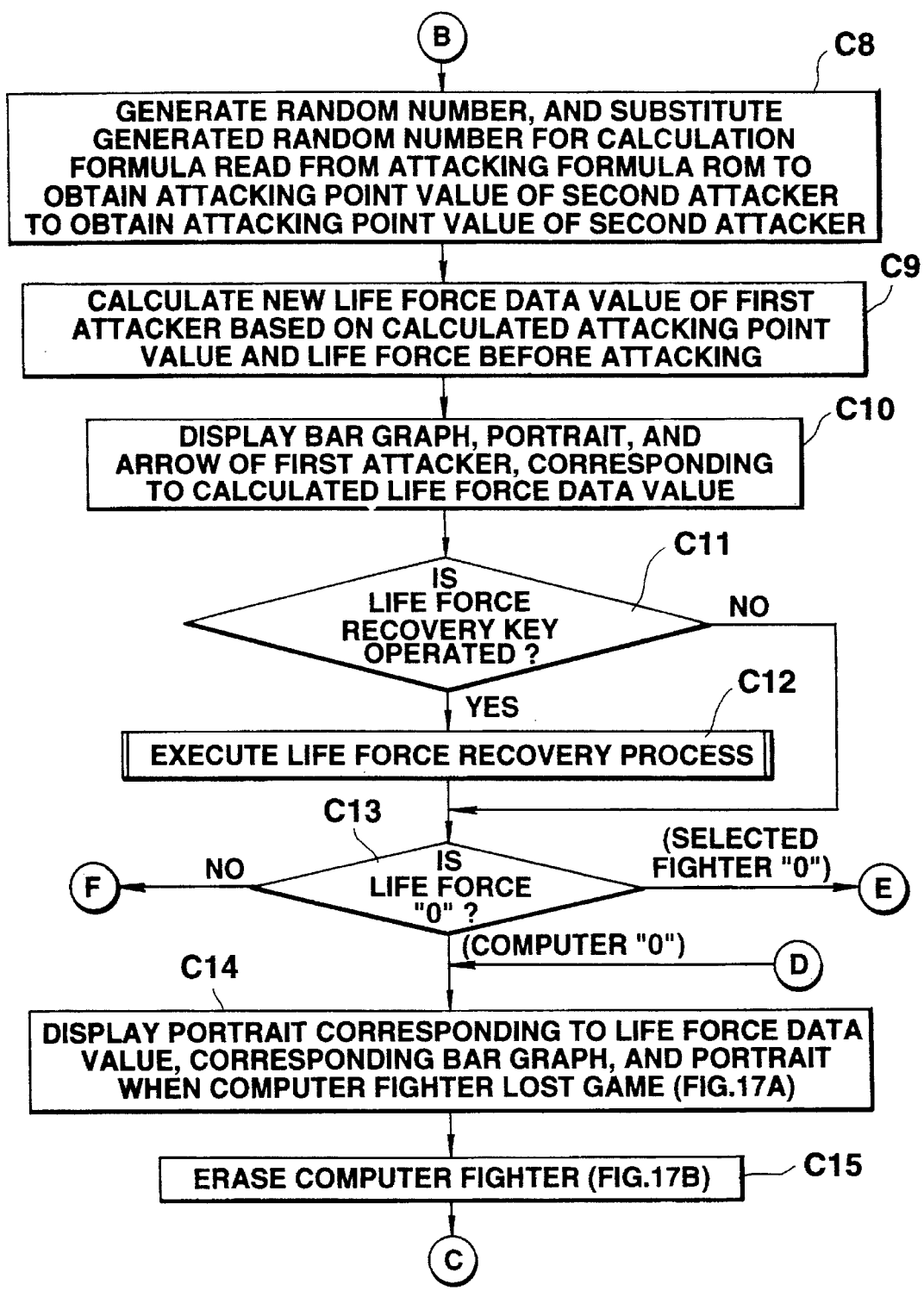
FIG. 13 is a flow chart for indicating a middle stage of the battle Game process operation.
Figure 14:
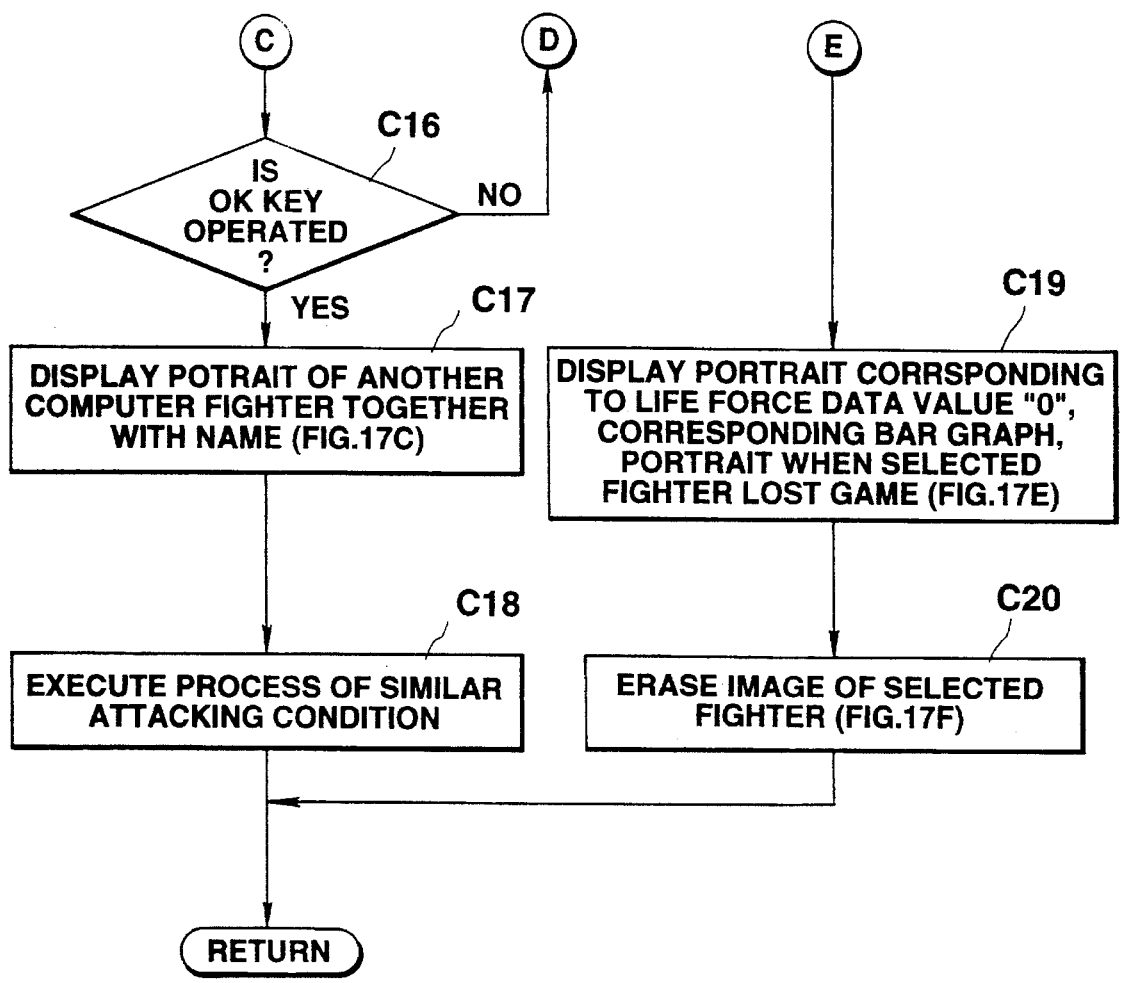
FIG. 14 is a flow chart for indicating a rear stage of the battle game process operation.
Figure 16G:
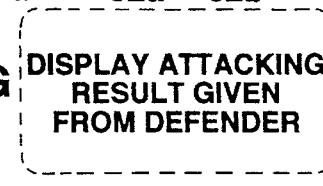

A battle process operation for the montage battle gate as defined at the step X4 of FIG. 6 will now be described with reference to flow charts shown in FIG. 12 to FIG. 14. At a first step C1 of the flow chart shown in FIG. 12, when it is judged that the game start key 20 is operated, the operation mode of the CPU 31 is set to the battle game mode. Thereafter, as shown in FIG. 16G, such a figure which represents the selected fighter under attacking is displayed at a step C2 in accordance with the bit map pattern previously stored in the ROM.

At the subsequent step C3, the random numbers "0" to "9" are produced from the random number generating unit 41. These random numbers are substituted for the random numbers of the attacking point calculation formula (formula 6) different from the basic value calculation formula (formula 5) previously stored in the attacking formula ROM 35, and the attacking point (BP) for the selected fighter 51a is calculated based upon this attacking point calculation formula (6).

On the other hand, in response to the above-explained process operation, the computer fighter 51b is attacked by the selected fighter 51a based on the calculated attacking point (BP) of the selected fighter 51a. Then, a step C4, new life force data (ESP) of the computer fighter 51b who has received the attack made by the selected fighter 51a by way of substituting the above-described attacking point (BP) value of the selected fighter 51a for another attacking point (BP) of the calculation formula (4) for the life force data after attacking which has been previously stored in the attacking formula ROM 35.

Figure 16H:
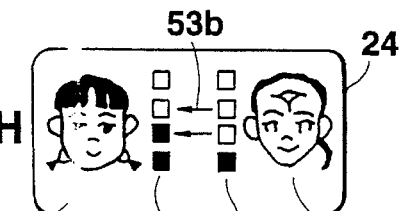

At the next step C5, as illustrated in FIG. 16H, there are displayed the portrait of the selected fighter 51a, the life force representing bar 52a corresponding to the attacking life force data (ESP), the portrait of the computer fighter 51b, and the life force representing bar 52b for the computer fighter, corresponding to the life force data (ESP) after attacking, which has been calculated at the previous step C4. Also, another attacking arrow 53b indicative of the attacking direction by the computer fighter 51b as the second fighter is displayed.

Figure 16I:
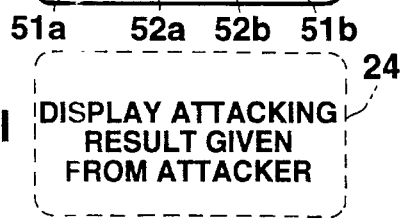

At the subsequent step C6, when it is judged that a predetermined time period has been measured by the CPU 31, such a figure that the computer fighter 51b is attacking is displayed in accordance with the bit map pattern previously stored in the ROM at a step C7 (see FIG. 16I).

Then, at a further step C8, the random numbers "0" to "9" are produced from the random number generating unit 41. These random numbers are substituted for the random numbers of the attacking point calculation formula (formula 6) different from the basic value calculation formula (formula 5) previously stored in the attacking formula ROM 35, and the attacking point (BP) for the computer fighter 51b is calculated based upon this attacking point calculation formula (6).

On the other hand, in response to the above-explained process operation, the selected fighter 51a is attacked by the computer fighter 51b based on the calculated attacking point (BP) of the computer fighter 51b. Then, a step C9, new life force data (ESP) of the selected fighter 51a who has received the attack made by the computer fighter 51b by way of substituting the above-described attacking point (BP) value of the computer fighter 51b for another attacking point (BP) of the calculation formula (4) for the life force data after attacking which has been previously stored in the attacking formula ROM 35. This calculated life force data (ESP) is stored into the life force data after attacking register 40d, and is updated as life force data (ESP) of the determined fighting power data register 40c.

Figure 16J:
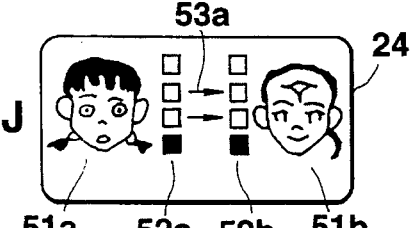

At the next step C10, as illustrated in FIG. 16J, there are displayed the portrait of the selected fighter 51a, the life force representing bar 52a for the selected fighter, corresponding to the life force data (ESP) after attacking calculated at the step C9, the portrait of the computer fighter 51b, and the life force representing bar 52b for the computer fighter. Also, another attacking arrow 53b indicative of the attacking direction by the selected fighter 51a as the fighter is displayed.

Thereafter, at a step C11, when it is judged that the life force recovery key 22 is operated, the process operation is advanced to the life force recovery process operation (FIG. 15) in which the life force data (ESP) of the selected fighter 51a may be recovered.

Either after the recovery process operation of the life force data (ESP) has been performed, or while the life force recovery key 22 is not yet operated, until the value of the life force data (ESP) for either the selected fighter 51a, or the computer fighter 51b becomes "0", the above-described attacking operation between the selected fighter 51a and the computer fighter 51b as defined at the steps C2 to C10 is repeated (steps C13, C2 to C10).

On the other hand, when the value of the life force data (ESP) of the computer fighter 51b becomes, e.g., "0", while repeating the attacking operation between the respective fighters at the previous steps C2 to C10, as shown in FIG. 17A, the portrait of the selected fighter 51a and also the life force representing bar 52a are displayed. At the same time, the present portrait of the computer fighter 51b is substituted by another portrait indicative of loser's expression, which has been previously stored in the expression part pattern ROM 37. Furthermore, another life force representing bar 52a for the computer fighter corresponding to the value "0" of the above-described life force data is displayed (steps C13 to C14).

At the next step C15, the portrait of the first computer fighter (LEVEL-1) 51b who has lost this battle game is erased from the display screen, as illustrated in FIG. 17B. In this case, the process operation as defined from the step C14 to the step C15 is repeated, and then the images as shown in FIG. 17A and FIG. 17B are repeatedly displayed (steps C16 to C14 and C15).

When the OK key 23 is manipulated under such a condition that the fighter 51a selected by the user succeeds in the battle game and the first computer fighter (LEVEL-1) 51b loses this battle game, the montage data corresponding to the second computer fighter (LEVEL-2) 51c is read out from a plurality of montage data previously stored in the montage ROM (not shown) for the computer fighters. Based on the read montage data about the second computer fighter 51c, the fighting power data (ESP), (PK), (TP) are calculated. At the same time, as represented in FIG. 17C, another portrait of the second computer fighter (LEVEL-2) 51c which has been formed based upon the montage data corresponding to this second computer fighter (LEVEL-2) 51c, is displayed together with only the life force data (ESP) among these fighting power data thereof on the liquid crystal display unit 24 (steps C16 to C17).

At the next step C18, the attacking operation between the selected fighter 51a and the second computer fighter (LEVEL-2) 51c is performed in a similar manner to the above-described operation (step C18).

Conversely, when the value of the life force data (ESP) becomes, e.g., "0" while repeating the attacking operation between the first computer fighter 51b and the selected fighter 51a at the steps C2 to C10, both of the portrait of the winner, i.e., the computer fighter 51*b* and the life force representing bar 52*b* are displayed as shown in FIG. 17E. Then, the present portrait of the selected fighter 51*a* is substituted by another portrait indicative of loser's expression, which has been previously stored in the expression part pattern ROM 37. Furthermore, the life force representing bar 52*a* for the selected fighter, corresponding to the value "0" of the life force data thereof is displayed (steps C13 to C19).

Thereafter, at a step C20, the present portrait of the selected fighter 51*a* who has lost this battle game is erased from the display screen of the liquid crystal dot matrix display unit 24.

LIFE FORCE RECOVERY PROCESS OPERATION

Figure 15:
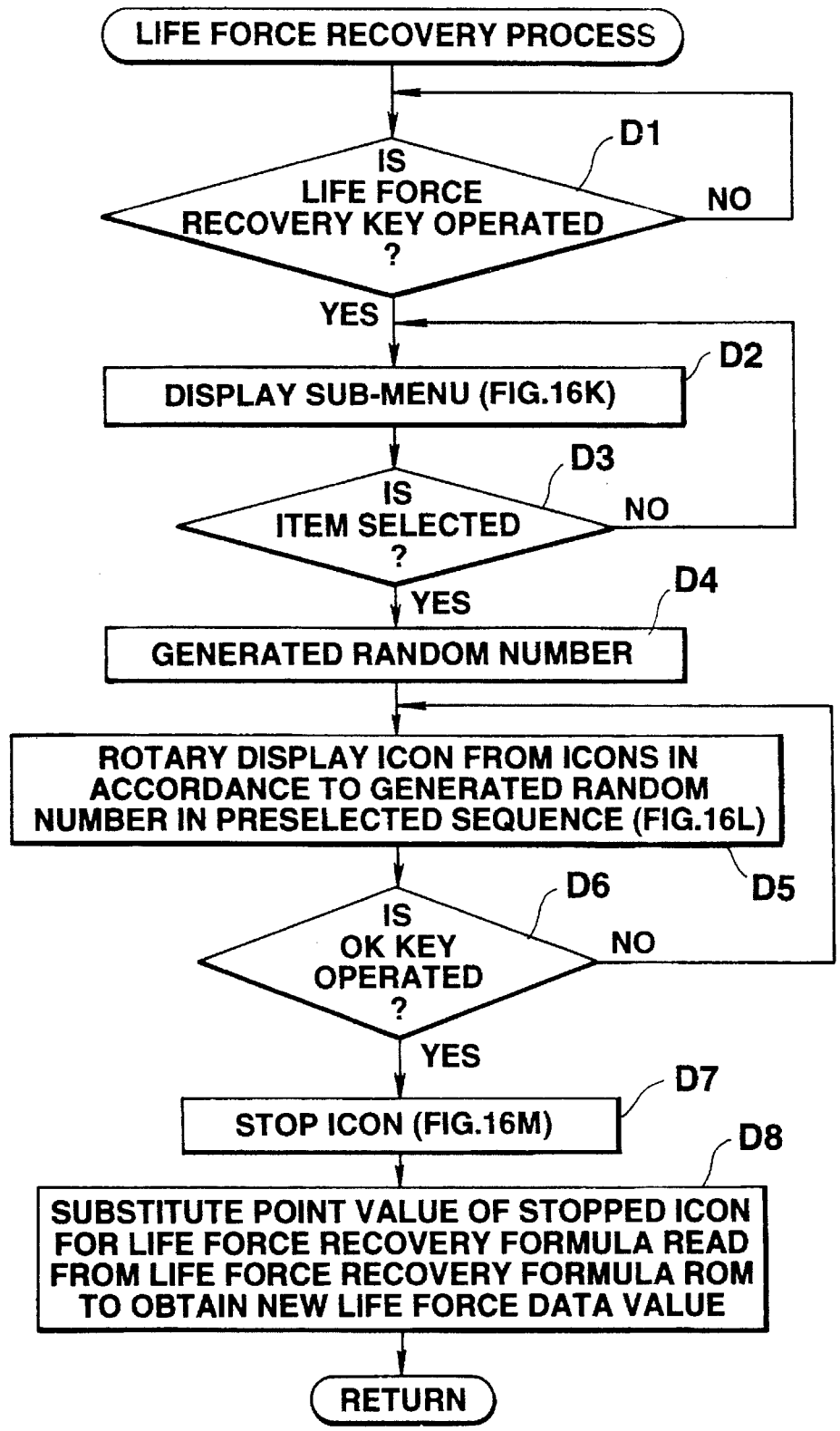
FIG. 15 is a flow chart for representing a life force recovery process operation executed during the battle Game processing operation.

With reference to a flow chart shown in FIG. 15, the life force recovery process operation as defined at the step C12 of the battle game process operation shown in FIG. 12 and FIG. 13 will now be described in detail.

Figure 16K:
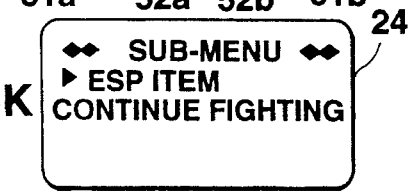

This life force recovery process operation is carried out when a judgement is made that the life force recovery key 22 is operated at a first step D1. In case that the operation mode of the CPU 31 is set to the life force recovery mode in accordance with this operation, as illustrated in FIG. 16K, such a sub-menu image is displayed on the liquid crystal display unit 24 based on the data about messages "ESP Item" and "Continue Fighting" read out from the battle message ROM 38 (step D2).

At the next step D3, it is judged that the "ESP item" to recover the life force is selected by operating the item selection key 16*b*, any one of the random numbers 0 to 9 is produced by the random number generating unit 41 (step D4).

Figure 16L:
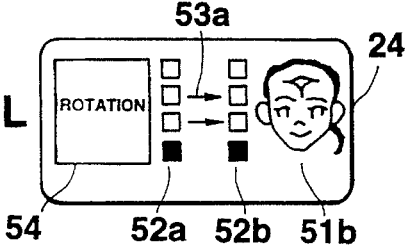

Then, as illustrated in FIG. 16L, under such conditions that the portrait of the computer fighter 51*b*, the life force representing bar 52*b* of this computer fighter 51*b*, the life force representing bar 52*a* for the selected fighter, and the attacker's arrow 53*a* are represented, 10 sorts of icon patterns 54*a* to 54*j* previously stored in the life force recovery point ROM 36 are sequentially displayed in a predetermined rotation sequence from the icon corresponding to the random number generated at the previous step D4 (step D5).

When at the previous step D4, the random number produced from the random number generating unit 41 is, for instance, 4, the icon (4) 54*d*, stored in the life force recovery point ROM 36 is displayed and then the subsequent icon (5) 54*e*, icon (6) 54*f*, icon (7) 54*g*, . . . , are successively, rotatively displayed in an endless rail form (steps D6 to D5). It should be noted that the respective icons 54*a* to 54*j* correspond to such image data having different pictorial forms as animal image data.

Figure 16M:
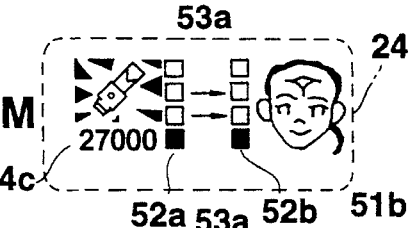

At the next step D6, when it is judged that the OK key 23 is operated, and the icon presently displayed on the liquid crystal display unit 24 is, for example, the icon (3) 54*c* (see FIG. 16M), the life time recovery point of "27000" previously stored in the life time recovery point ROM 36 corresponding to the icon (3) 54*c* is read. Then, the icon 54*c* containing this read recovery point "27000" is stopped and displayed at the display point of the portrait for the computer fighter 51*b* whose life force is tried to be recovered at a step D7.

At the subsequent step D8, based on the life time recovery formula (7) previously stored in the calculation formula ROM 34, the previous value "27000" of the life force recovery point corresponding to the icon 54*c* displayed in the step D7 is added to the value of the present life force data (ESP) stored in the determined fighting power data register 40*c*. The added value is stored in the life force data after recovery register 40*e*, and this value is used to update the latest life force data as new life force data (ESP) for the selected fighter. Then, the updated life force data is stored in the determined fighting power data register 40*c* (step D8).

Figure 16N:
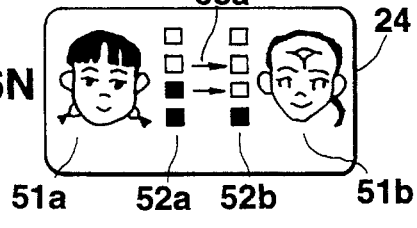

As a consequence, the portrait of the selected fighter 51*a* is displayed instead of the above-described icon 54*c* (see FIG. 16N), and also the life force representing bar 52*a* corresponding to the life time data after recovery is displayed.

As a consequence, in accordance with the above-described montage battle game apparatus of the preferred embodiment, when the sub-menu image is displayed by operating the life force recovery key 22 and then the ESP item is selected so as to recover the life force of the relevant fighter (in this case, the selected fighter 51*a*), these icons 54*a* to 54*j* corresponding to 10 sorts of recovery points previously in the life force recovery point ROM 36, are successively displayed in the rotary mode in accordance with a predetermined sequence instead of the display of the selected fighter 51*a* whose life force should be recovered. Accordingly, when one of these icons (e.g., the icon 54*c*) is displayed, if the OK key 23 is operated, then the above-described rotary representation of this icon 54*c* is stopped. At the same time, since the value "27000" of the life force recovery point corresponding to this icon 54*c* is added to the value of the life force data owned by the present selected fighter 51*a*, this life force can be recovered in consideration of the user's desire. Moreover, the user can manually select one desirable icon from a plurality of icons used to recover the life force, which are successively displayed in the rotary mode, and then this user can consider the most favorable life force data, so that such a battle game with the higher grade can be realized.

MODIFICATIONS

Although the liquid crystal dot matrix display unit is employed as the means for announcing the comparison result in the above-described preferred embodiment, this comparison result may be informed by way of sounds, voice, or may be printed out.

Also, although the respective part numbers are employed as the portion data in the above-explained embodiment, the respective part pattern data per se for constituting the object image may be alternatively utilized.

Furthermore, as the object images for comparisons in the above-described embodiment, both the selected fighter 51*a* and the computer fighters 51*b*, 51*c*, . . . , are utilized which are selected from a plurality of formed montage images, and a plurality of computer fighters previously stored in the montage ROM for the computer fighters. Alternatively, the selected fighters may be fighted with each other, otherwise the computer fighters may be fighted with each other.

Additionally, the fighters are fighted within a single battle game apparatus in the above-explained embodiment. Alternatively, a plurality of apparatus equipped with communication functions are employed, while the comparison data are communicated with each other by way of radio waves, or lines. Then, the selected fighters may be fighted with each other on the different apparatuses.

What is claimed is:

1. An electronic game apparatus for electronically playing a competing game, comprising:

numeral value data generating means for generating a plurality of numeral data having different values in an irregular sequence;

setting means for setting two article images formed by combining portion images corresponding to respective portions of the articles;

point data storage means for storing therein first point data corresponding to the respective portion images for constituting each of said article images as to each of said two article images set by said setting means;

judging means for allocating third point data to each of said two article images based upon said first point data stored in said point data storage means in correspondence with said respective article images, and also second point data corresponding to said numeral value data generated from said numeral value data generating means, and for judging a competing result between said two article images set by said setting means based upon magnitudes of said third point data allocated to the respective article images; and display means for displaying said competing result between said article images.

2. An electronic game apparatus as claimed in claim 1, wherein said display means includes means for displaying:

a first display in which said two articles set by said setting means are displayed as a first image; and a second display in which at least one of said two article images displayed as said first display is changed into a second article image having a different shape from that of said at least one article image of said first image corresponding thereto in accordance with the judgement result made by said judging means;

said display means displaying said second article image as a visual image.

3. An electronic game apparatus for electronically playing a competing game, comprising:

numeral value data generating means for generating a plurality of numeral data having different values in an irregular sequence;

setting means for setting a plurality of article image data constructed by combining portion image data with each other corresponding to respective portions of articles; and judging means for judging a competing result (i) between a plurality of article images represented by said plurality of article image data set by said setting means based on both point data set in correspondence with portion image data for constituting said article image data, and point data corresponding to said numeral value data generated from said numeral value data generating means; and (ii) between said article images judged by said judging means; and wherein:

said setting means includes:

portion image storage means for storing said plurality of portion image data corresponding to the respective portions of said articles;

designating means for designating one of said plural portion image data stored in said portion image storage means for each portion; and article image data storage means for storing a plurality of article image data made by combining said portion image data with each other for the respective portions designated by said designating means.

4. An electronic game apparatus for electronically playing a competing game, comprising:

numeral value data generating means for generating a plurality of numeral data having different values in an irregular sequence;

setting means for setting a plurality of article image data constructed by combining portion image data with each other corresponding to respective portions of articles; and judging means for judging a competing result (i) between a plurality of article images represented by said plurality of article image data set by said setting means based on both point data set in correspondence with the portion image data for constituting said article image data, and point data corresponding to said numeral value data generated from said numeral data generating means; and (ii) between said article images judged by said judging means; and wherein:

said judging means includes:

article image data selecting means for selecting two sets of article image data from a plurality of article image data set by said setting means in order to perform the competing judgement; and competing result judging means for judging the competing result between two sets of article images indicated by said selected article images based on both the point data corresponding to the numeral data generated by said numeral data generating means and the point data set in correspondence with said portion image data.

5. An electronic game apparatus as claimed in claim 1, wherein:

said two article images set by said setting means are face images.

6. An electronic game apparatus as claimed in claim 1, further comprising:

announcing means for announcing said competing result judged by said judging means in addition to a display of the competing result on said display means.

7. An electronic game apparatus for electronically playing a competing game, comprising:

numeral value data generating means for generating a plurality of numeral data having different values in an irregular sequence;

setting means for setting a plurality of article image data constructed by combining portion image data with each other corresponding to respective portions of articles;

judging means for judging a competing result (i) between a plurality of article images represented by said plurality of article image data set by said setting means based on both point data set in correspondence with the portion image data for constituting said article image data, and point data corresponding to said numeral value data generated from said numeral data generating means; and (ii) between said article images judged by said judging means; and image modifying means for modifying an article image represented by said article image data set by said setting means into another article image having a different form from that of the first-mentioned article image data in response to the competing result judged by said judging means.

8. An electronic game apparatus for electronically playing a competing game, comprising:

numeral value data generating means for generating a plurality of numeral data having different values in an irregular sequence;

setting means for setting a plurality of article image data constructed by combining portion image data with each other corresponding to respective portions of articles;

judging means for judging a competing result (i) between a plurality of article images represented by said plurality of article image data set by said setting means based on both point data set in correspondence with the portion image data for constituting said article image data, and point data corresponding to said numeral value data generated from said numeral data generating means; and (ii) between said article images judged by said judging means; and image erasing means for erasing said article images represented by said article image data set by said setting means from said display means in accordance with said competing result judged by said judging means.

9. An electronic game apparatus for electrically playing a competing game, comprising:

display means for displaying at least an image;

numeral data generating means for generating a plurality of numerical data having different values in an irregular sequence;

point data storage means for storing a plurality of point data corresponding to a plurality of article image data, respectively;

image data storage means for storing said plurality of article image data constructed by combining portion image data with each other with respect to a plurality of portions;

selecting means for selecting at least two sets of article image data from said plurality of article image data stored in said image data storage means;

display control means for causing at least said two sets of article image data selected by said selecting means to be displayed on said display means;

game starting instructions means for instructing starting of said competing game;

reading means for reading first point data corresponding to each of said two article images displayed on said display means in response to the instruction issued from said game starting instruction means from said point data storage means for each of said two article image data; and competing result determining means for allocating to said two sets of article image data, third point data formed based on both said first point data read by said reading means for each of said two sets of article image data and second point data corresponding to said irregularly generated numeral data, and for determining a competing result between said two article images based upon comparison results in magnitudes of said third point data allocated to said two sets of article image data.

10. An electronic game apparatus as claimed in claim 9, further comprising:

announcing means for announcing said competing result judged by said competing result determining means.

11. An electronic game apparatus as claimed in claim 10, further comprising:

image modifying means for modifying an article image represented by said article image data selected by said selecting means into another article image having a different form from that of the first-mentioned article image data in response to the competing result judged by said competing result determining means.

12. An electronic game apparatus as claimed in claim 9, further comprising:

image erasing means for erasing said article images represented by said article image data selected by said selecting means from said display means in accordance with said competing result judged by said competing result determining means.

13. An electronic game apparatus as claimed in claim 9, further comprising:

partial image data storage means for storing a plurality of partial image data with respect to a plurality of portions;

selecting means for selecting said plurality of partial image data stored in said partial image data storage means with respect to each of said portions; and image storage controlling means for causing a plurality of article image data constructed by combining the respective partial image data selected by said selecting means for the respective portions to be stored into said image data storage means.

14. An electronic game apparatus for determining a competing result based on at least first and second point data, comprising:

display means for displaying at least images representative of image data;

first data storage means for storing a plurality of first point data having different points corresponding to a plurality of first different image data and respective first image data;

second data storage means for storing second point data corresponding to a plurality of second image data constructed by combining partial image data corresponding to a plurality of image portions and said respective image data;

selecting means for selecting arbitrary second image data from said plurality of second image data stored in said second data storage means;

display control means for sequentially displaying said plurality of first different image data stored in said first data storage means and at the same time, for displaying the arbitrary second image data selected by said selecting means;

manual operation means for selecting arbitrary image data by a manual operation from said plurality of different image data sequentially displayed on said display means;

reading means for reading first point data corresponding to the first image data instructed by said manual operation means from said first data storage means, and also for reading second point data corresponding to the respective portion image data for constituting the second image data being displayed on said display means, while operating said manual operation means, from said second data storage means; and competing result determining means or setting third point data defined by said first and second point data read from said reading means as one of said first and second point data, and for determining a competing result based on a comparison result in magnitudes of said first and second point data.

15. An electronic game apparatus as claimed in claim 14, further comprising:

announcing means for announcing said competing result determined by said competing result determining means.

16. An electronic game apparatus as claimed in claim 14, further comprising:

image modifying means for modifying an article image represented by said second arbitrary image data selected by said selecting means into another image having a different form from that of said second arbitrary image data in response to the competing result determined by said competing result determining means.

17. An electronic game apparatus as claimed in claim 14, further comprising:

image erasing means for erasing a second image represented by said second arbitrary image data selected by said selecting means from said display means in accordance with said competing result determined by said competing result determining means.

18. An electronic game apparatus as claimed in claim 14, further comprising:

partial image data storage means for storing a plurality of partial image data with respect to a plurality of portions;

selecting means for selecting said plurality of partial image data stored in said partial image data storage means with respect to each of said portions; and image storage controlling means for causing a plurality of article image data constructed of combining the respective partial image data selected by said selecting means for the respective portions to be stored into said image storage means, as said second image data.

19. An electronic game apparatus as claimed in claim 14, further comprising:

article image data storage means for storing a plurality of article image data;

selecting means for selecting at least two sets of article image data from said plural image data stored in said article image data storage means; and image data storage controlling means for causing said two sets of article image data selected by said selecting means to be stored into said second data storage means as said second image data.

20. An electronic game apparatus as claimed in claim 14 wherein one image data among said plural second image data stored in said second data storage means corresponds to article image data produced by a user by combining the partial image data with each other with regard to said plurality of portions, whereas the other image data among said second image data corresponds to article image data produced by a preselected combination of said partial image data with respect to said plurality of portions.

21. An electronic game apparatus as claimed in claim 14 wherein said display control means performs such a control operation that said plurality of first image data stored in said first data storage means are sequentially displayed on said display means every time a predetermined time has passed.

22. An electronic game apparatus as claimed in claim 14 wherein said plurality of second image data selected by said selecting means correspond to face image data constructed by combining the partial image data for said plural portions.

* * * * *